US012108125B2

(12) United States Patent
He et al.

(10) Patent No.: US 12,108,125 B2
(45) Date of Patent: Oct. 1, 2024

(54) 360-DEGREE VIDEO DELIVERY OVER NEXT GENERATION NETWORK

(71) Applicant: VID SCALE, INC., Wilmington, DE (US)

(72) Inventors: Yong He, San Diego, CA (US); Yan Ye, San Diego, CA (US)

(73) Assignee: VID Scale, Inc., Wilmington, DE (US)

( * ) Notice: Subject to any disclaimer, the term of this patent is extended or adjusted under 35 U.S.C. 154(b) by 0 days.

(21) Appl. No.: 18/237,772

(22) Filed: Aug. 24, 2023

(65) Prior Publication Data

US 2023/0421863 A1    Dec. 28, 2023

Related U.S. Application Data

(63) Continuation of application No. 17/245,788, filed on Apr. 30, 2021, now Pat. No. 11,770,594, which is a
(Continued)

(51) Int. Cl.
*H04L 65/60* (2022.01)
*H04L 65/80* (2022.01)
(Continued)

(52) U.S. Cl.
CPC .......... *H04N 21/816* (2013.01); *H04L 65/60* (2013.01); *H04L 65/80* (2013.01); *H04L 67/02* (2013.01);
(Continued)

(58) Field of Classification Search
CPC .......... H04N 21/816; H04N 21/21805; H04N 21/44; H04N 21/472; H04N 21/6587;
(Continued)

(56) References Cited

U.S. PATENT DOCUMENTS 7,489,322 B2    2/2009 Beach
7,536,657 B2    5/2009 Shimizu et al.
(Continued)

FOREIGN PATENT DOCUMENTS

CN    1324463 A    11/2001
CN    1722908 A    1/2006
(Continued)

OTHER PUBLICATIONS

3rd Generation Partnership Project (3GPP), TR 26.957 V0.7.0, "Technical Specification Group Services and System Aspects, Study on Server and Network-Assisted DASH (SAND) for 3GPP Multimedia Services (Release 14)", Sep. 2016, pp. 1-42.
(Continued)

*Primary Examiner* — El Hadji M Sall
(74) *Attorney, Agent, or Firm* — Condo Roccia Koptiw LLP

(57) ABSTRACT

Systems, methods, and instrumentalities are disclosed for a 360-degree video streaming. A video streaming device may receive a 360-degree video stream from a network node. The video streaming device may determine a viewport associated with the video streaming device and/or the 360-degree video stream. The video streaming device may determine (e.g., based on the viewport) to request in advance a first segment and a second segment of the 360-degree video stream. The video streaming device may determine a relative priority order for the first segment and the second segment. The video streaming device may generate an anticipated requests message. The anticipated requests message may indicate the determined relative priority order, for example, by listing the first segment and the second segment in decreasing relative priority based on the determined relative priority order. The video streaming device may send the anticipated requests message to the network node.

20 Claims, 32 Drawing Sheets

Related U.S. Application Data continuation of application No. 16/618,793, filed as application No. PCT/US2018/035607 on Jun. 1, 2018, now Pat. No. 11,025,993.

(60) Provisional application No. 62/514,405, filed on Jun. 2, 2017.

(51) Int. Cl.
    *H04L 67/02*      (2022.01)
    *H04N 21/218*     (2011.01)
    *H04N 21/44*      (2011.01)
    *H04N 21/472*     (2011.01)
    *H04N 21/6587*    (2011.01)
    *H04N 21/81*      (2011.01)
    *H04N 21/845*     (2011.01)

(52) U.S. Cl.
    CPC ....... *H04N 21/21805* (2013.01); *H04N 21/44* (2013.01); *H04N 21/472* (2013.01); *H04N 21/6587* (2013.01); *H04N 21/8456* (2013.01)

(58) Field of Classification Search
    CPC ....... H04N 21/8456; H04N 21/234363; H04N 21/4728; H04L 65/60; H04L 65/80; H04L 67/02
    See application file for complete search history.

(56) References Cited

U.S. PATENT DOCUMENTS

| | | | |
|---|---|---|---|
| 10,334,224 B2 | 6/2019 | Ha et al. | |
| 10,600,153 B2 | 3/2020 | Roimela et al. | |
| 10,666,941 B1 | 5/2020 | Doron | |
| 10,893,086 B2* | 1/2021 | Ljung | H04L 65/80 |
| 10,951,818 B2 | 3/2021 | Wang | |
| 2006/0087987 A1 | 4/2006 | Witt et al. | |
| 2010/0017686 A1 | 1/2010 | Luby et al. | |
| 2012/0254918 A1 | 10/2012 | Takahashi | |
| 2013/0103849 A1 | 4/2013 | Mao et al. | |
| 2014/0080535 A1 | 3/2014 | Gauvreau et al. | |
| 2014/0232819 A1 | 8/2014 | Armstrong | |
| 2014/0341026 A1 | 11/2014 | Gahm et al. | |
| 2015/0003315 A1 | 1/2015 | Chen et al. | |
| 2015/0134784 A1 | 5/2015 | De Vleeschauwer et al. | |
| 2015/0149592 A1 | 5/2015 | Gibbon et al. | |
| 2015/0180924 A1 | 6/2015 | Ocallaghan | |
| 2016/0150212 A1 | 5/2016 | Moura et al. | |
| 2016/0198012 A1 | 7/2016 | Fablet et al. | |
| 2016/0286128 A1 | 9/2016 | Zhou | |
| 2016/0314101 A1 | 10/2016 | Zhang et al. | |
| 2017/0084073 A1 | 3/2017 | Pio et al. | |
| 2017/0332117 A1 | 11/2017 | Haritaoglu et al. | |
| 2017/0336705 A1 | 11/2017 | Zhou et al. | |
| 2018/0139254 A1* | 5/2018 | Oyman | H04N 21/23439 |
| 2018/0190327 A1 | 7/2018 | Coward et al. | |
| 2019/0158815 A1 | 5/2019 | He et al. | |
| 2019/0174205 A1 | 6/2019 | Yamagishi | |
| 2019/0379720 A1* | 12/2019 | Yu | H04L 65/65 |
| 2021/0105333 A1* | 4/2021 | Chen | H04L 67/02 |

FOREIGN PATENT DOCUMENTS

| | | |
|---|---|---|
| CN | 102547592 A | 7/2012 |
| CN | 102656895 A | 9/2012 |
| CN | 104918077 A | 9/2015 |
| CN | 105791882 A | 7/2016 |
| CN | 106101610 A | 11/2016 |
| CN | 106131615 A | 11/2016 |
| EP | 2 824 883 A1 | 1/2015 |
| EP | 3 065 406 A1 | 9/2016 |
| JP | 2004-048546 A | 2/2004 |
| JP | 2015-222954 A | 12/2015 |
| JP | 2016-025633 A | 2/2016 |
| JP | 2016-105593 A | 6/2016 |
| JP | 2016-165105 A | 9/2016 |
| JP | 2018-534661 A | 11/2018 |
| WO | 2018/049221 A1 | 3/2018 |

OTHER PUBLICATIONS

Champel, Mary-Luc, "Descriptions of Core Experiments on DASH Amendment", Systems Subgroup/DASH, ISO/IEC JTC1/SC29/WG11, MPEG2017/N16854, Hobart, Australia, Apr. 2017, pp. 1-9.

Champel et al., "Report on High Quality DASH-VR", CE Coordinators, ISO/IEC JTC1/SC29/WG11, MPEG2017/m40683, Hobart, Australia, Apr. 2017, 8 pages.

Choi et al., "Text of ISO/IEC 23000-20 CD Omnidirectional Media Application Format", Systems, ISO/IEC JTC1/SC29/WG11 N16636, Geneva, Switzerland, Jan. 2017, 48 pages.

Choi et al., "Text of ISO/IEC Dis 23090-2 Omnidirectional Media Format", Systems, ISO/IEC JTC1/SC29/WG11, N16824, Hobart, Australia, Apr. 2017, 63 pages.

Fielding et al., "Hypertext Transfer Protocol (HTTP/1.1): Semantics and Content", Internet Engineering Task Force (IETF), Request for Comments: 7231, Jun. 2014, 101 pages.

IEEE, "IEEE Standard for Information Technology—Telecommunications and Information Exchange Between Systems Local and Metropolitan Area Networks—Specific Requirements", IEEE Std. 802.11ahTM-2016, Part 11: Wireless LAN Medium Access Control (MAC) and Physical Layer (PHY) Specifications, Amendment 2: Sub 1 GHz License Exempt Operation, May 5, 2017, 4 pages.

ISO/IEC, "Draft Text of ISO/IEC 23009-1 3rd Edition", Systems, ISO/IEC JTC1/SC29/WG11 N16467, Chengdu, China, Oct. 2016, 1 page.

ISO/IEC, "Dynamic Adaptive Streaming over HTTP (DASH), Part 5: Server and Network Assisted DASH (SAND)", ISO/IEC FDIS 23009-5:2015(E), 2015.

Kim et al., "Routing as a Service Solution for IP-Based Services: An Evolutionary Approach to Introducing ICN in the Real World", The Institute of Electronics, Information and Communication Engineers Transactions on Communications, 2016, vol. E99-B, No. 12, pp. 2477-2488.

Park, Kyungmo, "Description of Core Experiments on MPEG Media Transport", MPEG Media Transport (MMT), ISO/IEC JTC1/SC29/WG11, MPEG 2016/w16451, Chengdu, China, Oct. 2016, 43 pages.

Skupin et al., "HEVC Tile Based Streaming to Head Mounted Displays", 2017 14th IEEE Annual Consumer Communications & Networking Conference (CCNC), Jan. 2017, pp. 613-615.

Swaminathan et al., "Study of Draft International Standard for 23009-6: DASH with Server Push and WebSockets", Systems, ISO/IEC JTC1/SC29/WG11/N16666, Geneva, CH, Jan. 2017, pp. 1-48.

\* cited by examiner

360-DEGREE VIDEO DELIVERY OVER NEXT GENERATION NETWORK

CROSS REFERENCE TO RELATED APPLICATIONS

This application is a continuation application of U.S. Non-Provisional Application Ser. No. 17/245,788, filed Apr. 30, 2021, which is a continuation application of U.S. Non-Provisional Application Ser. No. 16/618,793, filed Dec. 2, 2019, now issued U.S. Pat. No. 11,025,993, which is the National Stage Entry under 35 U.S.C. § 371 of Patent Cooperation Treaty Application No. PCT/US2018/035607, filed Jun. 1, 2018, which claims priority to U.S. provisional patent application No. 62/514,405, filed Jun. 2, 2017, which is incorporated herein by reference in its entirety.

BACKGROUND 360-degree video is a rapidly growing format emerging in the media industry. 360-degree video is enabled by the growing availability of virtual reality (VR) devices. 360-degree video may provide the viewer a new sense of presence. When compared to rectilinear video (e.g., 2D or 3D), 360-degree video may pose difficult engineering challenges on video processing and/or delivery. Enabling comfort and/or an immersive user experience may require high video quality and/or very low latency. The large video size of 360-degree video may be an impediment to delivering the 360-degree video in a quality manner at scale.

SUMMARY

Systems, methods, and instrumentalities are disclosed for a 360-degree video streaming. A video streaming device (e.g., such as a wireless transmit/receive unit (WTRU)) may receive a 360-degree video stream from a network node. The network node may be a network attachment point (NAP). The video streaming device may determine a viewport associated with the video streaming device and/or the 360-degree video stream. The viewport may be a spatial region of the 360-degree video stream that is being presented to a user of the video streaming device. The viewport may be determined based on an orientation of the video streaming device. The video streaming device may determine (e.g., based on the viewport) to request in advance a first segment of the 360-degree video stream and a second segment of the 360-degree video stream. The 360-degree video stream may include two or more temporal frames. Each of the temporal frames of the 360-degree video stream may be partitioned into a plurality of tiles. The first segment may be a first tile of a frame of the two or more temporal frames of the 360-degree video stream. The second segment may be a second tile of the frame of the two or more temporal frames of the 360-degree video stream.

The video streaming device may determine a relative priority order for the first segment and the second segment. The relative priority order may be determined by determining a first priority for the first segment and a second priority for the second segment, for example, based on a time preference, a quality preference, and/or a location relative to the viewport. The video streaming device may generate an anticipated requests message. The anticipated requests message may indicate the determined relative priority order, for example, by listing the first segment and the second segment in decreasing relative priority based on the determined relative priority order. The video streaming device may send the anticipated requests message to the network node.

A network node may receive, from a first video streaming device, a first anticipated requests message that indicates a first plurality of segments in a first relative priority order. The network node may receive, from a second video streaming device, a second anticipated requests message that indicates a second plurality of segments in a second relative priority order. The network node may be a NAP. The network node may determine a priority associated with each of the first plurality of segments (e.g., based on the first relative priority order) and each of the second plurality of segments (e.g., based on the second relative priority order). The network node may identify a common segment indicated by the first anticipated requests message and the second anticipated requests message as having the same priority. The network node may send, to a server, a request for the common segment. The network node may receive the common segment and may multicast the common segment to the first video streaming device and the second video streaming device. For example, the network node may determine that the common segment represents a same video segment having the same priority within a time window. The network node may determine to request the common segment from a server. The network node may unicast a segment indicated as having different priorities to the first video streaming device and second video streaming device.

The network node may determine that a segment is common among the first plurality of segments and the second plurality of segments. For example, the network node may determine that a common segment is indicated in the first anticipated requests message and the second anticipated requests message. The common segment may represent a same video segment within a time window. The network node may determine a first priority value for the common segment as indicated by (e.g., based on) the first anticipated requests message and a second priority value for the common segment as indicated by (e.g., based on) the second anticipated requests message. The network node may send a request for the common segment, e.g., to a server. The network node may receive the common segment, e.g., from the server. On a condition that the first priority value and the second priority value are the same, the network node may multicast the common segment to the first video streaming device and the second video streaming device. On a condition that the first priority value and the second priority value are different, the network node may unicast the common segment to the first video streaming device and the second video streaming device.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

A 360-degree video may be a component of virtual reality (VR). A 360-degree video may be captured and/or rendered on a sphere. A spherical video format may not be delivered directly using some or all available video codecs. A 360-degree video (e.g., spherical video) may be compressed by projecting the spherical video onto a 2D plane using some projection method. The projected 2D video may be coded (e.g., using some or all available video codecs). An example of the projection method may include an equirectangular projection (ERP).

Figure 1:
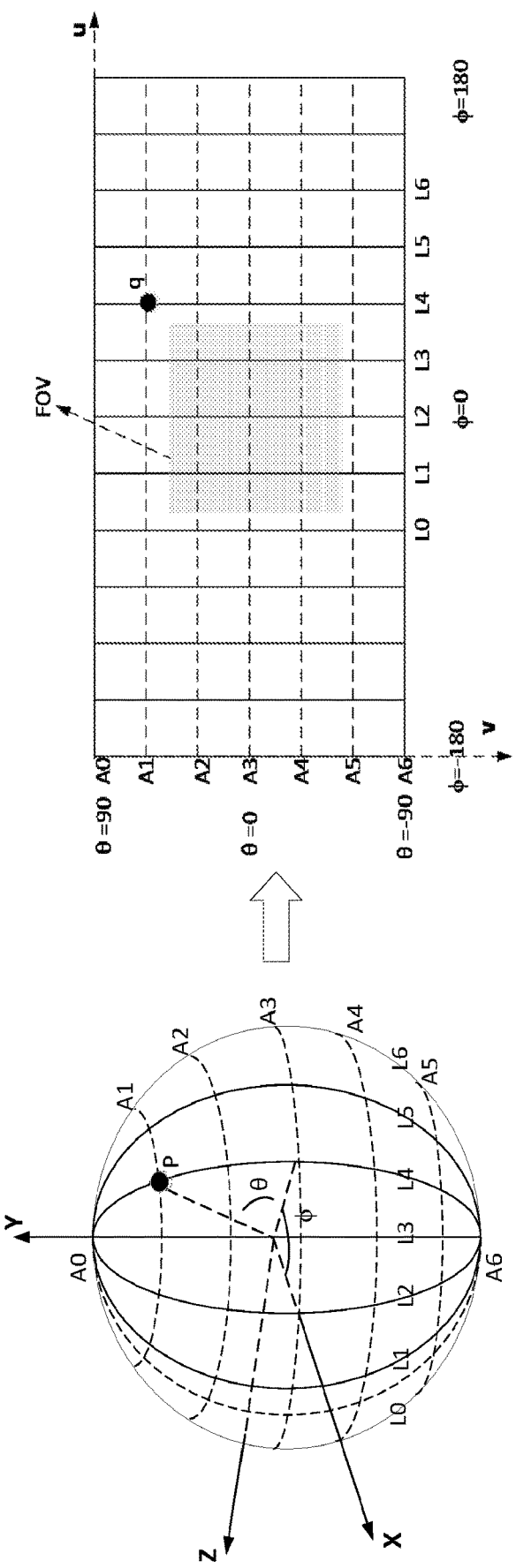
FIG. 1 illustrates an example equirectangular projection (ERP) for a 360-degree video.

FIG. 1 illustrates an example ERP for a 360-degree video. For example, an ERP may use one or more of the following equations to map a first point P with coordinate (θ, φ) on a sphere to a second point P with coordinate (u, v) on a 2D plane, as shown in FIG. 1.

$$u=\varphi/(2*pi)+0.5 \quad (1)$$

$$v=0.5-\theta/(pi) \quad (2)$$

Figure 2:
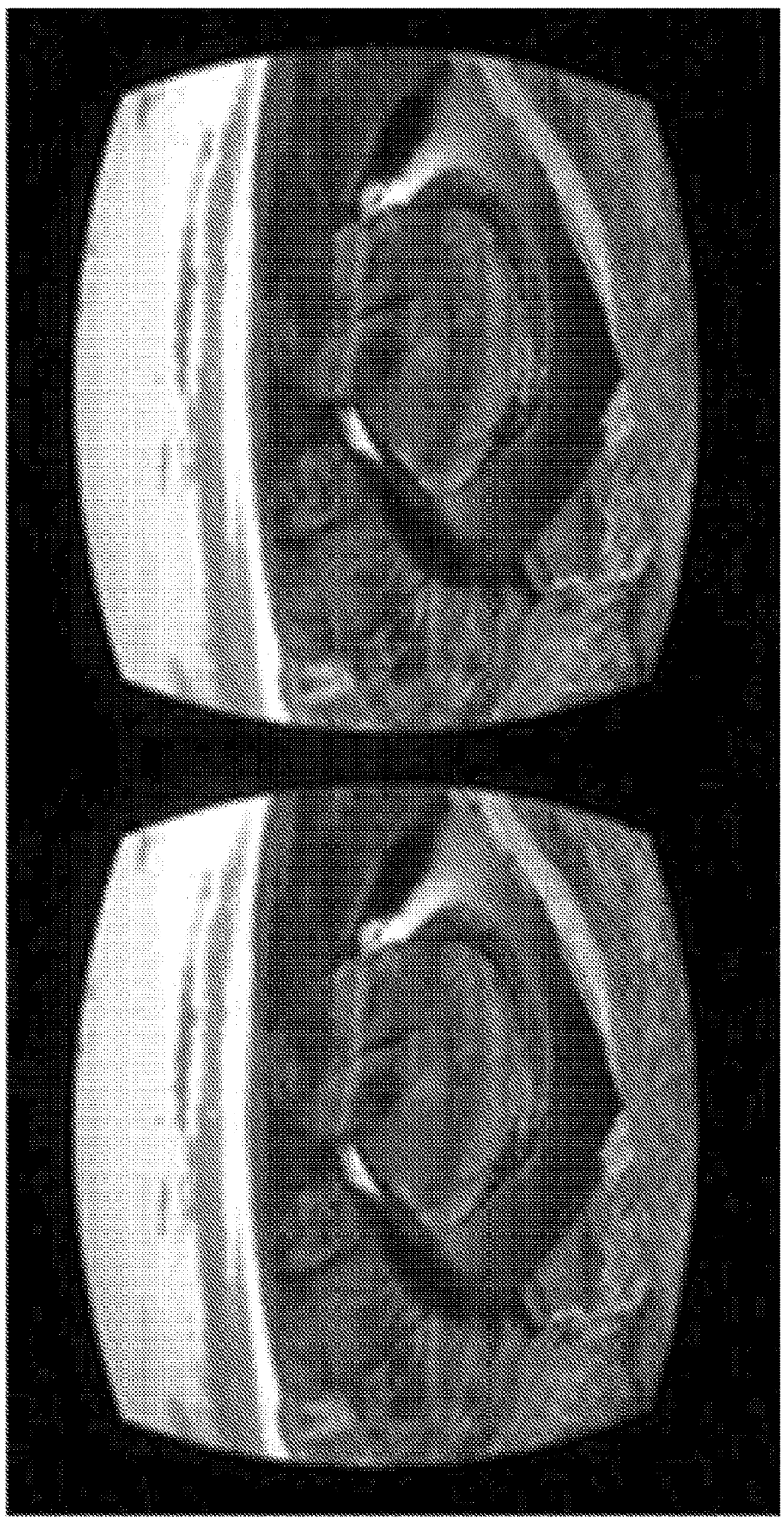
FIG. 2 illustrates an example portion of a 360-degree video displayed on a head mounted device (HMD).

FIG. 2 illustrates an example portion of a 360-degree video displayed on a head mounted device (HMD). When viewing a 360-degree video, a user may be presented with a part of the video, for example, as shown in FIG. 2. The part of the video may be changed when the user looks around and/or zooms the image. The part of the video may be changed based on feedback provided by the HMD and/or other types of user interface (e.g., a wireless transmit/receive unit (WTRU) or a smartphone). A spatial region of the entire 360-degree video may be called a viewport. The viewport be fully or partially presented to the user. The viewport may have one or more different quality than other parts of the 360-degree video.

Figure 3:
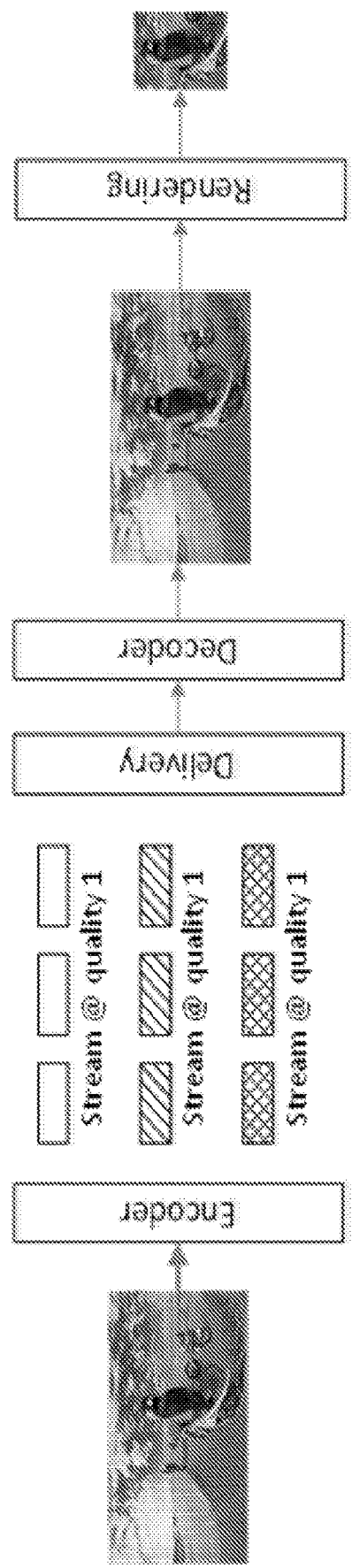
FIG. 3 illustrates an example processing and delivering of a 360-degree video in an ERP format.

360-degree video represented in ERP or other projection format may be encoded as a single-layer bitstream using certain video encoders such as H.264 and H.265. The entire coded bitstream may be stored at a server, may be transmitted to a receiver side, may be decoded by a decoder, and the region of the decoded picture corresponding to the current viewport may be rendered to a user. FIG. 3 illustrates an example of processing and delivering of a 360-degree video in an ERP format. As shown in FIG. 3, the 360-degree video in ERP format may be encoded into one or more bitrate segments for adaptive streaming. A user may select a particular segment dynamically depending on a network condition. The region of decoded frame may be rendered to a user based on the user's orientation and/or viewport. The example shown in FIG. 3 may use a large bandwidth to encode an entire 360-degree video in order to provide an immersive user experience while a small portion of the video is consumed by a user.

An omnidirectional video (e.g., an entire video region) may be represented by one or more video pictures that may correspond to a current viewport. A current viewport may be a subset of an entire video region represented by the video pictures. The current viewport may be viewed by a user at a given time. For example, an omnidirectional video may display a current viewport (e.g., the area currently being seen by a user). Displaying a subset (e.g., viewport) of an entire video may lower a transmission bandwidth and/or lower decoding complexity.

In a single bitstream viewport adaptive approach, a 360-degree video may be encoded into a single bitstream. More bits may be allotted on a particular region (e.g., the region corresponding to a viewport) relative to the other regions of a 360-degree video frame. Multiple bitstreams may be encoded for a 360-degree video, where each bitstream may correspond to a particular viewport. One or more bitstreams may be encoded for the same viewport having different characteristics (e.g., different bitrates). A receiver may select a particular bitstream based on a network condition, a viewer's current or predicted orientation, and/or viewport. The overall bitrate may be reduced, and high quality image may be delivered on the visible viewport area while low quality image may be delivered on other non-visible areas. One or more metadata may indicate a viewport area.

Figure 4:
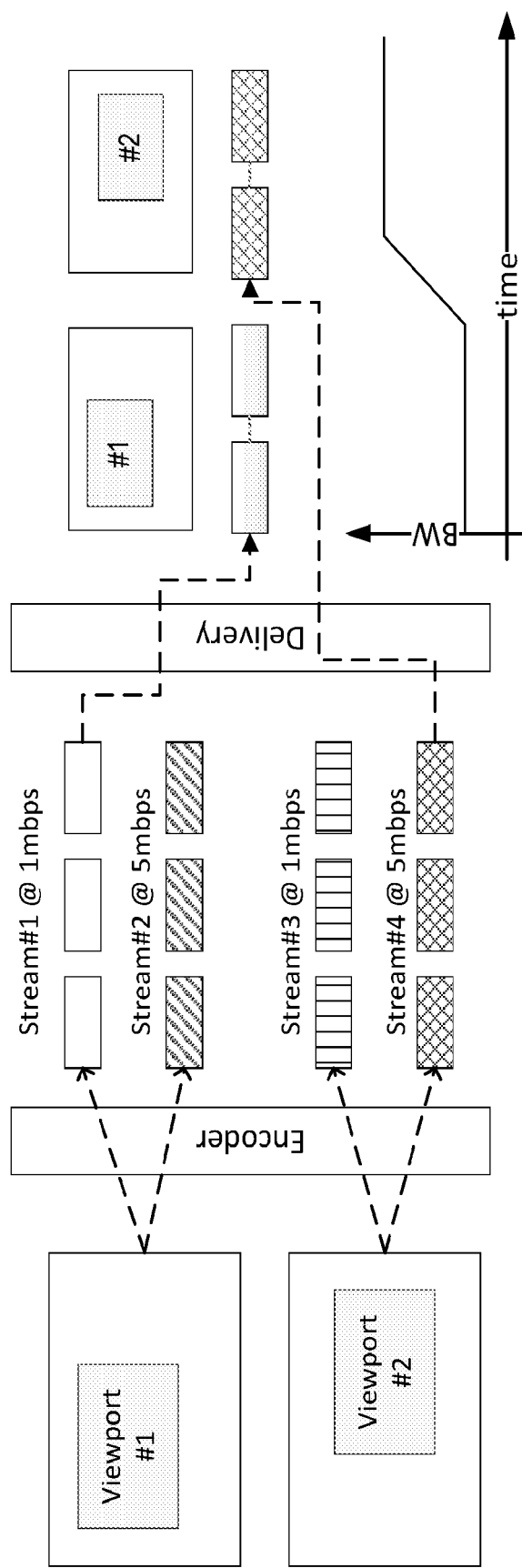
FIG. 4 illustrates an example single stream viewport adaptive approach for processing and delivering a 360-degree video.

FIG. 4 illustrates an example single stream viewport adaptive approach for processing and delivering a 360-degree video. Two or more viewports (e.g., viewport #1 and viewport #2) may be identified in a 360-degree video. More bits may be allocated for viewport area than the remaining area of the video frame. For example, stream #1 and/or stream #2 may allocate more bits on viewport #1 area than the remaining area of the video frame. Each stream may be coded with different bandwidth. For example, stream #1 may be coded at 1 mbps, and stream #2 may be coded at 5 mbps. Stream #3 and/or #4 may allocate more bits on viewport #2 area than the remaining area of the video frame. Stream #3 may be coded at 1 mbps, and stream #4 may be coded at 5 mbps. Based on a user's viewing orientation and/or network bandwidth, a user may select a stream accordingly. A user, as described herein, may be referred to and/or used interchangeably by one or more of the following: a WTRU, a client, a client WTRU, a DASH client, a streaming client, a video streaming device, and/or the like. For example, based on the users viewing orientation and/or network bandwidth, the user may select stream #1 when watching viewport #1 via low bandwidth (BW) channel and may switch to stream #4 when watching viewport #2 via high BW channel.

A tile based viewport adaptive approach may include splitting a source content into tile sequences before encoding. A tile sequence may cover a subset of a spatial area of a full panorama content. A tile sequence may be encoded independently from each other as a single-layer bitstream. One or more bitstreams may be encoded from the same sub-picture sequence (e.g., for different bitrates). Each tile bitstream may be encapsulated in a file as a track and may be available for streaming. At a receiver side, the tracks to be streamed may be selected based on a user's orientation and/or viewport metadata. A client may receive one or more tile tracks covering an entire omnidirectional content. Higher quality tile tracks may be received for a current viewport, and lower quality tile tracks may be received for the remaining and currently non-visible areas. Each track may be decoded with a separate decoder.

Figure 5:
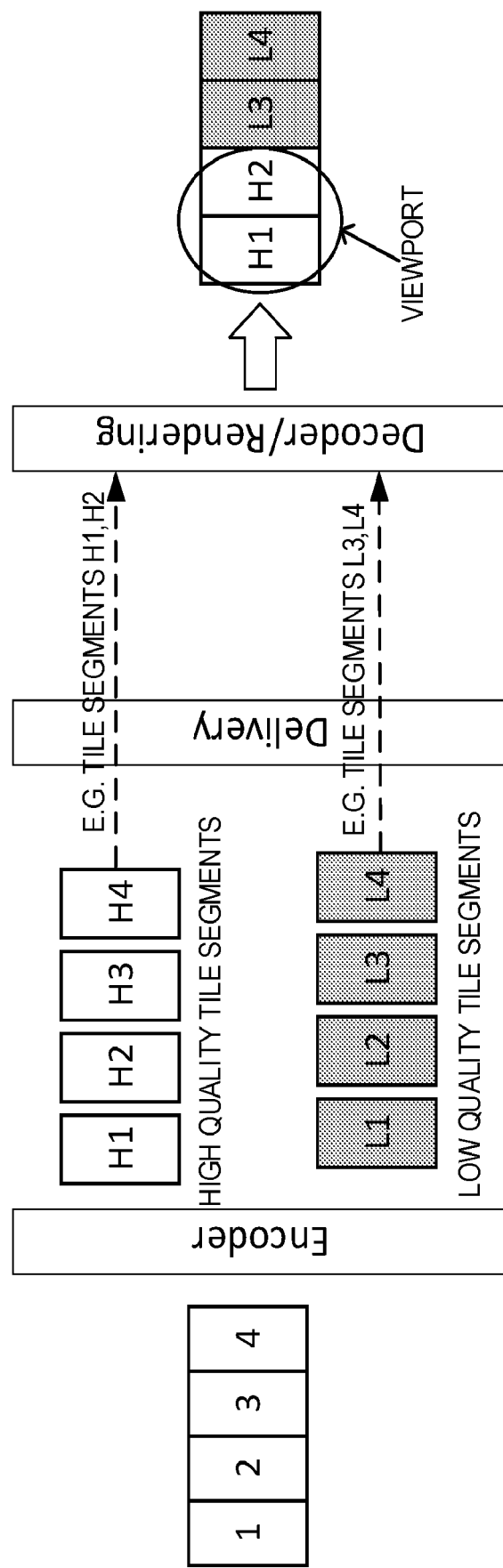
FIG. 5 illustrates an example tile based viewport adaptive approach for processing and delivering a 360-degree video.

FIG. 5 illustrates an example tile-based viewport adaptive approach for processing and delivering a 360-degree video. As shown in FIG. 5, a 360-degree frame may be partitioned into one or more tiles. A tile may be encoded into a high quality bitstream (e.g., H1, H2, H3, and/or H4) and/or a low quality bitstream (e.g., L1, L2, L3, and/or L4). A receiver may select different tile bitstreams based on the orientation and/or viewport metadata. For example, high quality tiles (e.g., H1 and/or H2) may be selected for a viewport region, and low quality tiles (e.g., L3 and/or L4) may be selected for other regions (e.g., non-visible areas).

Figure 6:
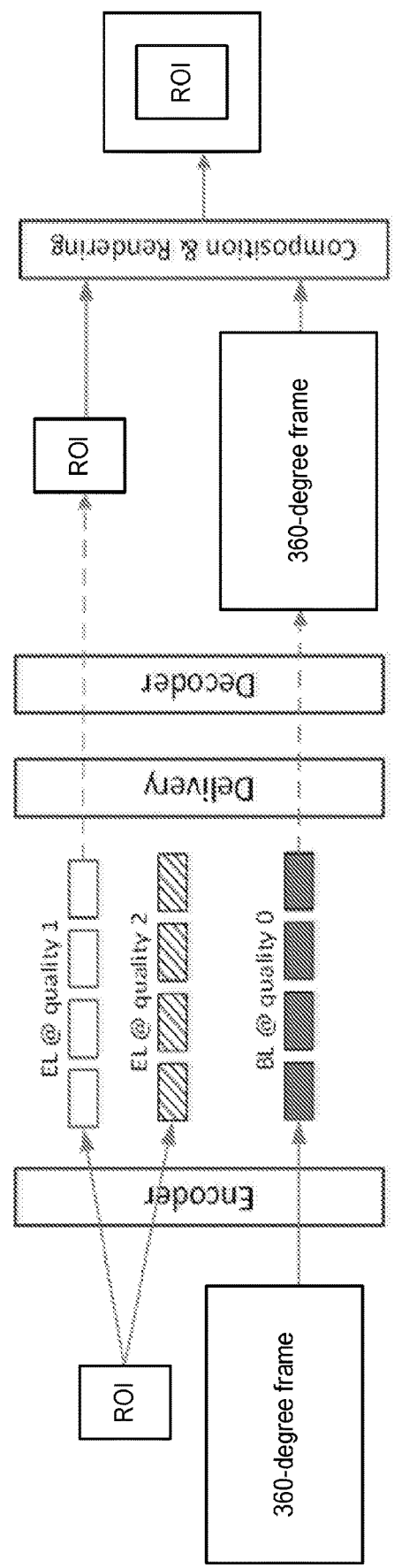
FIG. 6 illustrates an example layer based viewport adaptive approach for processing and delivering a 360-degree video.

FIG. 6 illustrates an example layer-based viewport adaptive approach for processing and delivering a 360-degree video. A base layer may be coded with a 360-degree video (e.g., an entire 360-degree video) using a video encoding approach. One or more region-of-interest (ROI) enhancement layers (ELs) may be encoded with scalable video coding. For example, one or more ROI ELs may be encoded with scalable video coding with an inter-layer prediction. In another example, one or more ROI ELs may be encoded with scalable video coding without an inter-layer prediction. For example, one or more layers per each tile position may be coded, and each layer may have different bitrate and/or resolution. The ROI ELs may be spatial and/or quality scalability layers. One or more scalable high efficiency video coding (SHVC) bitstreams may be encoded for differing bitrates. Bitrate adaptation may be configured to handle with one or more ELs. As shown in FIG. 6, the base layer may be received and decoded. One or more ELs may be selected based on the received and/or decoded current viewing orientation.

Next generation network (NGN) platform may provide a flexible routing solution based on information centric networking (ICN). The NGN platform may be a hybrid of ICN and internet protocol (IP). For example, a NGN platform may be configured to re-introduce multicast that may drive down bandwidth usage.

Figure 7:
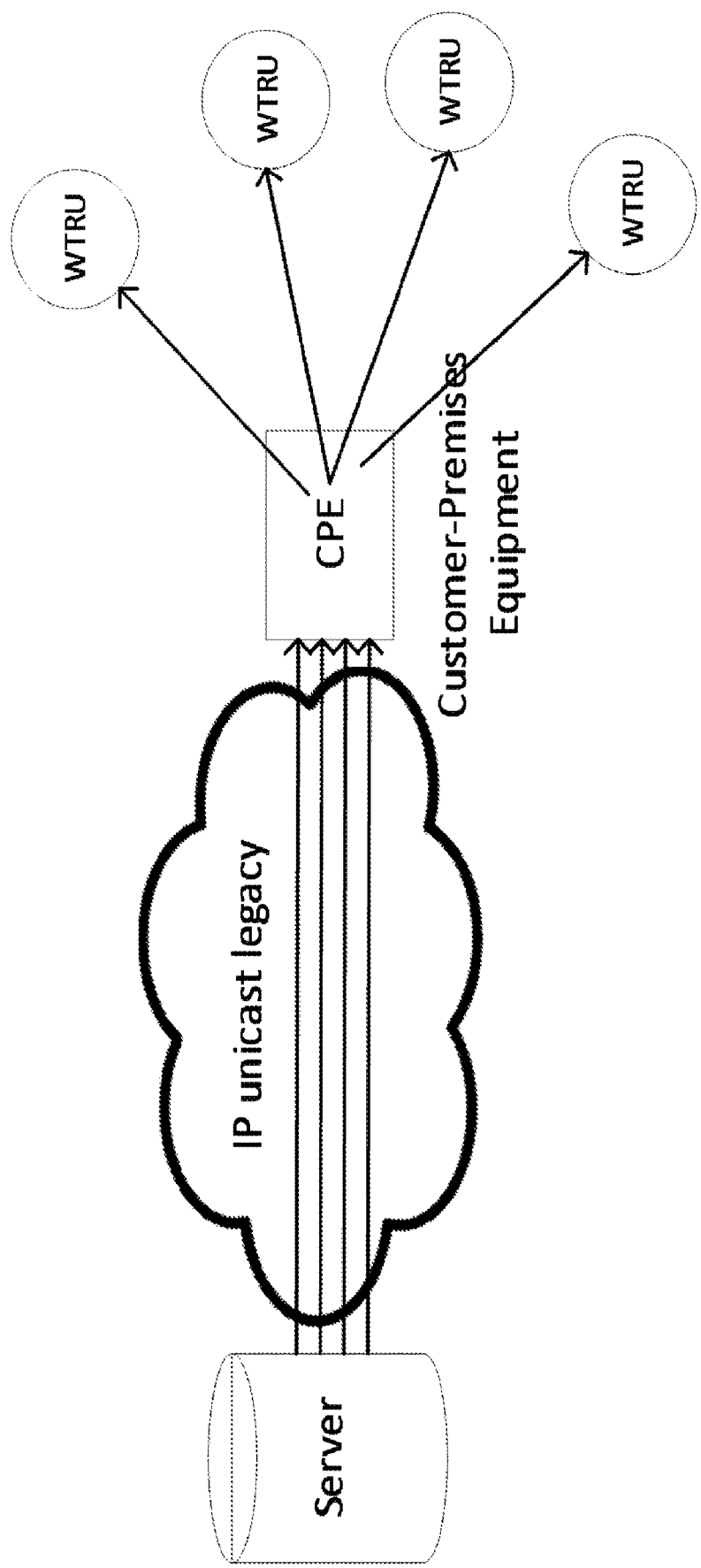
FIG. 7 illustrates an example of internet protocol (IP) unicast approach.

FIG. 7 illustrates an example IP unicast approach. As shown in FIG. 7, a server may respond to one or more WTRU requests and may deliver one or more requested contents to each WTRU separately even if multiple WTRUs may request the same content at approximately same time. One or more content delivery networks (CDNs) may be used for a popular content to reduce the overall traffic. Configuring CDNs may be complex and may result in inefficiencies associated with indirections, which may be unsustainable for emerging network, such as 5G network.

Figure 8:
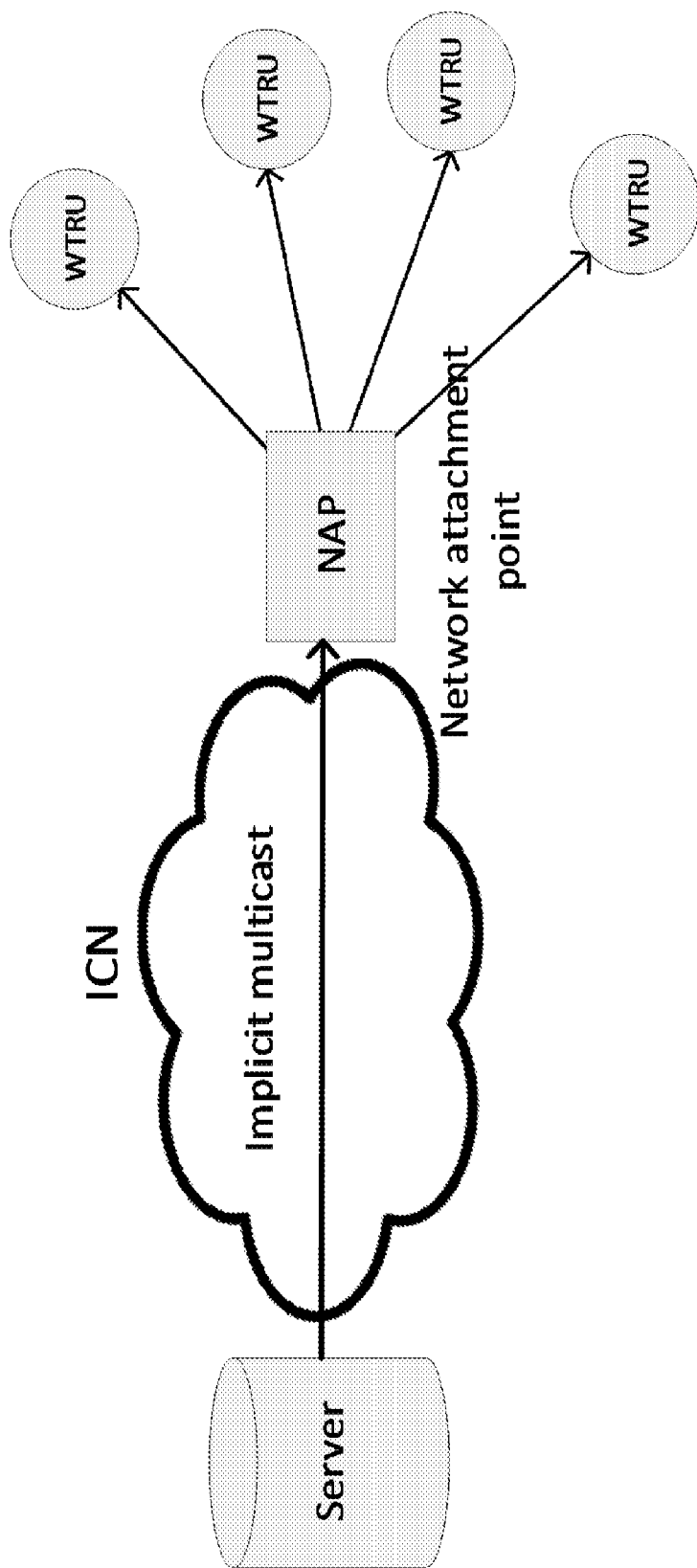
FIG. 8 illustrates an example of information centric networking (ICN) approach.

FIG. 8 illustrates an example ICN approach. As shown in FIG. 8, an implicit multicast may be configured to be used when two or more WTRUs are watching the same video content at approximately same time. The ICN may use a gateway (e.g., a network attachment point (NAP)). The gateway may be configured as an access gateway from two or more customers to a network. The NAP may be configured to handle some or all protocols (e.g., IP, transmission control protocol (TCP), hyper transfer protocol (HTTP), and/or the like) and may provide standard gateway functions such as network address translation (NAT), firewalling and/or dynamic IP address assignment. The ICN network may appear as a standard IP network to WTRUs and/or peering networks with a HTTP to ICN translation mechanism carried out by NAP. The NAP may parse some or all WTRU HTTP requests to a server, and may identify the WTRUs requesting an identical content from the server within a given time window (T) (e.g., to determine WTRUs viewing the same content at approximately the same time). The NAP may send a request to the server, and the system may provide an implicit multicast to deliver the requested content to some or all WTRUs. The implicit multicast approach described herein may reduce the overall bandwidth and/or server load. For WTRUs requesting a different content or requesting the same content but exceeding the given time window (T), a unicast approach may be used to deliver the content from the server to the requesting WTRUs. A hybrid multicast/unicast approach described herein may provide a network utilization through native multicast for video streaming use cases such as live steaming, video on demand, video sharing, personalized VR applications, and/or the like.

MPEG Dynamic Adaptive Streaming over HTTP (MPEG-DASH) may be an example delivery format that may provide end users with the best possible video experience by dynamically adapting to changing network conditions. DASH may be built on top of the HTTP/TCP/IP stack.

DASH may define a manifest format, which may be a media presentation description (MPD), and/or segment formats.

Figure 9:
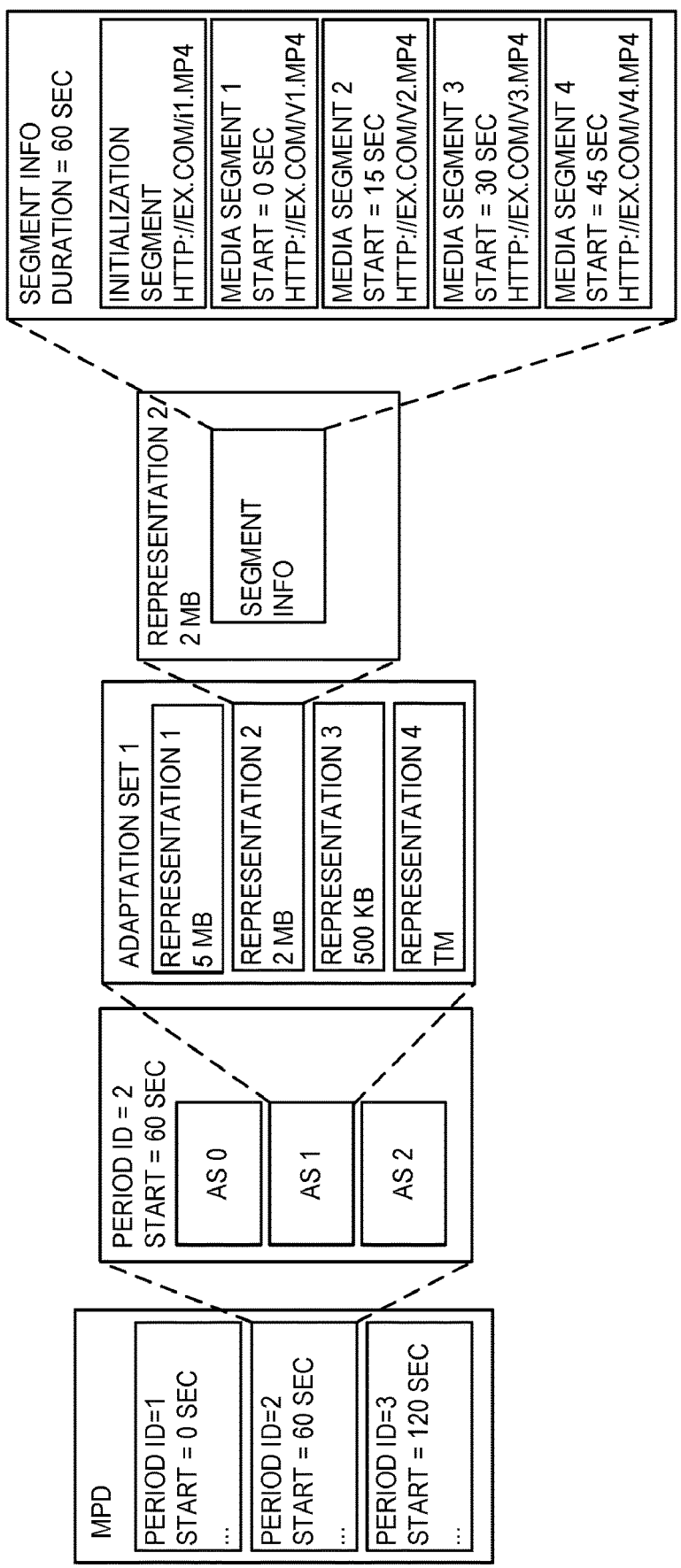
FIG. 9 illustrates an example media presentation description (MPD) hierarchical data model.

The MPD may include an extensible markup language (XML) document that may include metadata for a DASH client to construct appropriate HTTP-URLs to access video segments (e.g., as described herein) in an adaptive manner during streaming sessions. FIG. 9 illustrates an example MPD hierarchical data model. The MPD may describe a sequence of Periods, where a consistent set of encoded versions of the media content components does not change during a Period. Each Period may include one or more adaptation sets (e.g., AdaptationSet).

An AdaptationSet may represent a set of encoded versions of one or more media content components sharing one or more identical properties (e.g., such as the language, the media type, the picture aspect ratio, the role, the accessibility, the viewpoint, and/or the rating property). For example, a first AdaptationSet may include different bitrates of the video component of the same multimedia content. A second AdaptationSet may include different bitrates of the audio component (e.g., lower quality stereo and/or higher quality surround sound) of the same multimedia content. Each AdaptationSet may include one or more Representations.

A Representation may describe a deliverable encoded version of one or more media components, varying from other representations by bitrate, resolution, number of channels and/or other characteristics. Each Representation may include one or more segments. One or more attributes of a Representation element (e.g., such as @id, @bandwidth, @qualityRanking, and/or @dependencyId) may be used to specify one or more properties of the associated Representation.

A Segment may be a unit of data (e.g., largest unit of data) that can be retrieved with a HTTP request. A segment may have a URL (e.g., an addressable location on a server). Each segment may be downloaded using HTTP GET or HTTP GET with byte ranges.

A DASH client may parse a MPD XML document. The DASH client may select a collection of AdaptationSets suitable for its environment, for example, based on information provided in the AdaptationSet elements. Within an AdaptationSet, the client may select a Representation. The client may select a Representation based on the value of @bandwidth attribute, client decoding capability and/or client rendering capabilities. The client may download an initialization segment of the selected Representations. The client may access the content (e.g., by requesting entire segments or byte ranges of segments). When the presentation has started, the client may continue to consume the media content. For example, the client may request (e.g., continuously request) media segments and/or parts of media segments during the presentation. The client may play content according to a media presentation timeline. The client may switch Representations taking into updated information from the client's environment. For example, the client may switch from a first Representation to a second Representation based on updated information from the client's environment. The client may play the content (e.g., continuously) across Periods (e.g., two or more Periods). When the client consumes media contained in the Segments towards the end of the announced media in the Represen-tation, the media presentation may be terminated and a new Period may be started and/or the MPD may be re-fetched.

A MPD descriptor element, which may be referred to as a Descriptor, may be provided to an application to instantiate one or more description elements with an appropriate scheme information. Certain Descriptors (e.g., content protection, role, accessibility, rating, viewpoint, frame packing, and/or UTC timing descriptor) may include a @schemeIdUri attribute to identify the relative scheme. A MPD element, which may be a supplemental property descriptor (e.g., SupplementalProperty), may include a metadata that may be used by a DASH client for optimizing processing. The MPD element, which may be an essential property descriptor (e.g., EssentialProperty), may include a metadata for processing the containing element.

Server and network assisted DASH (SAND) may specify messages exchanging between streaming clients and network element or between various network elements. Messages between streaming clients (e.g., DASH clients) and network elements or between various network elements (e.g., including DASH aware network element (DANE)) may provide information about real-time operational characteristics of networks, servers, proxies, caches, CDNs, DASH client's performance and status, and/or the like.

One or more of the following SAND messages may be used: AnticipatedRequests, AcceptedAlternatives, AbsoluteDeadline, DeliveredAlternative, and/or the like.

AnticipatedRequests message may allow a DASH client to announce to a DANE which specific set of segments a DASH client may be interested in. The AnticipatedRequests message may signal a set of segments in representations that a DASH client may likely to select and may request soon. Table 1 shows example parameters of AnticipatedRequests message.

TABLE 1

Example parameters of AnticipatedRequests message

| Parameter | Type | Cardinality | Description |
| --- | --- | --- | --- |
| AnticipatedRequests | Object | 1 | |
|   request | array | 1...N | List of anticipated requests |
|     sourceUrl | url | 1 | URL for a segment of a given representation. |
|     range | string | 0...1 | This may be a byte range specification when the segment is a part of the content referred to by sourceUrl. |
|     targetTime | date-time | 0...1 | Time at which the DASH client may expect to request the resource identified by sourceUrl. |

AcceptedAlternatives message may allow DASH clients to inform DANEs on the media delivery path (e.g., caching DANEs) when DASH clients request a given DASH segment that the DASH clients may be willing to accept other DASH segments as alternatives. A client may include alternative segments if the client is ready to receive the alternative segments and may be able to play the alternative segments. Table 2 shows example parameters of AcceptedAlternatives message.

TABLE 2

Example parameters of AcceptedAlternatives message

| Parameter | Type | Cardinality | Description |
|---|---|---|---|
| AcceptedAlternatives | array | 1...N | The ordered list of acceptable alternatives. Preferred alternatives may be listed first. |
| alternative | object | 1 | Specification of one acceptable alternative. |
| sourceUrl | url | 1 | This may be the URL of the alternative, as deduced from the MPD@sourceUrl for requesting the (sub)segment of the acceptable representation. If no protocol is present at the beginning of the URL, it may be a relative URL with regards to the URL of the segment request to which this message is attached. |
| range | string | 0...1 | This may be the byte range specification when the segment is a part (e.g., only part) of the content referred to by sourceUrl. It may have the same syntax as the @range attribute of an URLType. |
| bandwidth | integer | 0...1 | May include a bandwidth in bits per second that may be included (e.g., considered as necessary by the client) receive the alternative in good conditions. |
| deliveryScope | integer | 0...1 | May include a parameter that indicates the number of caching DANEs that may be reached before removing this alternative from the list when forwarding the request. DANEs may be expected to decrement this counter when forwarding the request and may remove the alternative from the list when counter reaches 0. |

AbsoluteDeadline message may allow DASH clients to indicate to the DANE the absolute deadline in wall-clock time by when the requested segment needs to be completely received. Table 3 shows example parameters of AbsoluteDeadline message.

TABLE 3

Example parameters of AbsoluteDeadline messages

| Parameter | Type | Cardinality | Description |
|---|---|---|---|
| AbsoluteDeadline | object | 1 | |
| deadline | date-time | 1 | Absolute deadline for the segment to be available in the receiver. |

DeliveredAlternative message may be a response to an AcceptedAlternatives message sent by a DASH client. A DANE may deliver an alternative segment rather than the requested segment. If a DANE delivers an alternative segment rather than the requested segment, the DANE may send a DeliveredAlternative message to the DASH client to inform that the response includes a segment alternative and not the requested segment. Table 4 shows example parameters of DeliveredAlternative message.

TABLE 4

Example parameters of DeliveredAlternative message

| Parameter | Type | Cardinality | Description |
|---|---|---|---|
| DeliveredAlternative | object | 1 | Description of what may be delivered when a DANE sends a response containing an alternative representation. |
| initialUrl | url | 0...1 | This may be the URL of the initially requested segment. Within a request/response |

TABLE 4-continued

Example parameters of DeliveredAlternative message

| Parameter | Type | Cardinality | Description |
|---|---|---|---|
| | | | exchange in HTTP, the requested URL may be implicitly known in the response because there is a 1 to 1 association between them. It may not be repeated explicitly. |
| contentLocation | url | 1 | This may be the URL of the actual delivered content. |

The basic mechanisms of MPEG-DASH over HTTP/1.1 may be augmented by utilizing the features and/or capabilities that may be provided by the recent IPs such as HTTP/2 and/or WebSocket.

Figure 10:
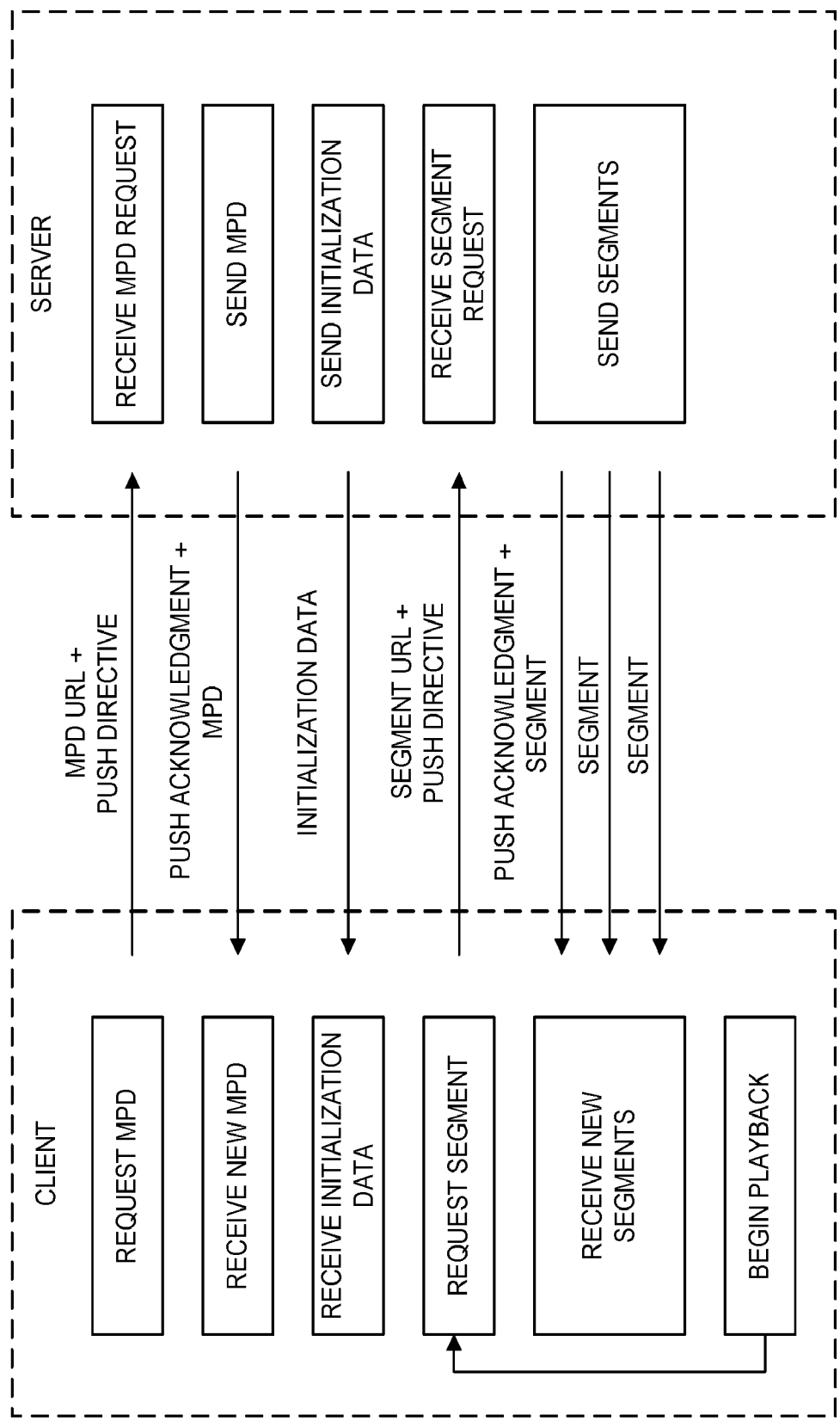
FIG. 10 illustrates an example workflow of video streaming using DASH server push.

FIG. 10 illustrates an example workflow of video streaming using DASH server push. A client may request a MPD and media segments, with a push strategy. For example, a client may request the MPD first and may request media segments, using a push strategy. Initialization data may be pushed in response to a push strategy associated to the MPD request by a server. After receiving the requested MPD, the client may start requesting one or more video segments from the server with the respective DASH segment URL and/or a segment push strategy. The server may respond with the requested video segment, followed by the push cycles as indicated by the segment push strategy. The client may start playing back the video after a minimum amount of data is received. The process described herein may repeat until the end of the media streaming session.

Table 5 shows an example push strategy types. Table 6 shows an example of which request each PushType may apply to.

TABLE 5

Example of DASH server push strategy types

| PushType | Description |
|---|---|
| urn:mpeg:dash:fdh:2016:push-fast-start | Indication that, along with a MPD, initialization data, and/or a given number of initial media segments, may be considered for push. A server receiving such push strategy may push some or all available Initialization Segments and/or some media segments related to the requested MPD within the constraints defined by provided attributes (*). A client receiving such push strategy may be informed that a server may intend to push some or all available Initialization Segments and/or some Media Segments within the constraints defined by provided attributes (*). If attributes are not specified, the server may push what the server may consider the most appropriate (*) by default. |
| urn:mpeg:dash:fdh:2016:push-list | Indication that some segments as described by the URL list may be considered for push. A server receiving such push strategy may use it to identify some segments to push. A client receiving such push strategy may be informed on the segments that the server intends to push. |
| urn:mpeg:dash:fdh:2016:push-next | Indication that the next K segments in the order of time, using the requested segment as the initial index may be considered for push. A server receiving such push strategy may push consecutive to the requested one. A client receiving such push directive may be informed that a server intends to push the next segments consecutive to the requested one. |
| urn:mpeg:dash:fdh:2016:push-none | Indication that no push may occur. A server receiving such push strategy may prevent from pushing. A client receiving such push directive may be informed that a server does not intend to push. |
| urn:mpeg:dash:fdh:2016:push-template | Indication that some segments as described by the URL template may be considered for push. A server receiving such push strategy may use it to identify some segments to push. A client receiving such push directive may be informed on the segments that the server intends to push. |
| urn:mpeg:dash:fdh:2016:push-time | Indication that the next segments in the order of time, continuing until the segment time (e.g., presentation time of the first frame) of a segment exceeds time T, may be considered for push. A server receiving such push strategy may push a given duration of media segments. A client receiving such push directive may be informed that a server intends to push a given duration of media segments. |

TABLE 6

Examples of valid request types and parameters for each PushType

| PushType | Request Type | PUSH_PARAM |
|---|---|---|
| urn:mpeg:dash:fdh:2016:push-fast-start | MPD | FastStartParams |
| urn:mpeg:dash:fdh:2016:push-list | Segment | URLList |
| urn:mpeg:dash:fdh:2016:push-next | Segment | INTEGER |
| urn:mpeg:dash:fdh:2016:push-none | MPD or Segment | N/A |
| urn:mpeg:dash:fdh:2016:push-template | Segment | URLTemplate |
| urn:mpeg:dash:fdh:2016:push-time | Segment | INTEGER |

360-degree video may consume a large amount of bandwidth due to the high resolution and/or high frame rate to provide a compelling immersive experience. For use cases such as VR sharing, live VR streaming and/or social VR application, hundreds and thousands VR users may watch the same 360-degree video while focusing on different viewports. The viewport adaptive approaches described herein (e.g., tile-based or layer-based processing and delivery approaches) may reduce the bandwidth consumption for VR user(s).

ICN based routing approach supported by NGN platform may provide an opportunity to reduce the bandwidth for multiple VR users. For example, commonly shared region of a 360-degree video may be fetched from a server (e.g., one time) and may be forwarded to multiple VR users. One or more unique viewport segments may be fetched from the server and may be forwarded to the corresponding WTRU individually. For example, when two VR users are watching the same viewport using a tile-based streaming approach, the NGN may achieve multicast gain since both users are sharing the same high quality viewport tiles and/or the remaining low quality tiles. A different decision making policy at the client side may result in different sequences of HTTP requests being issued by each VR WTRU.

Figure 11:
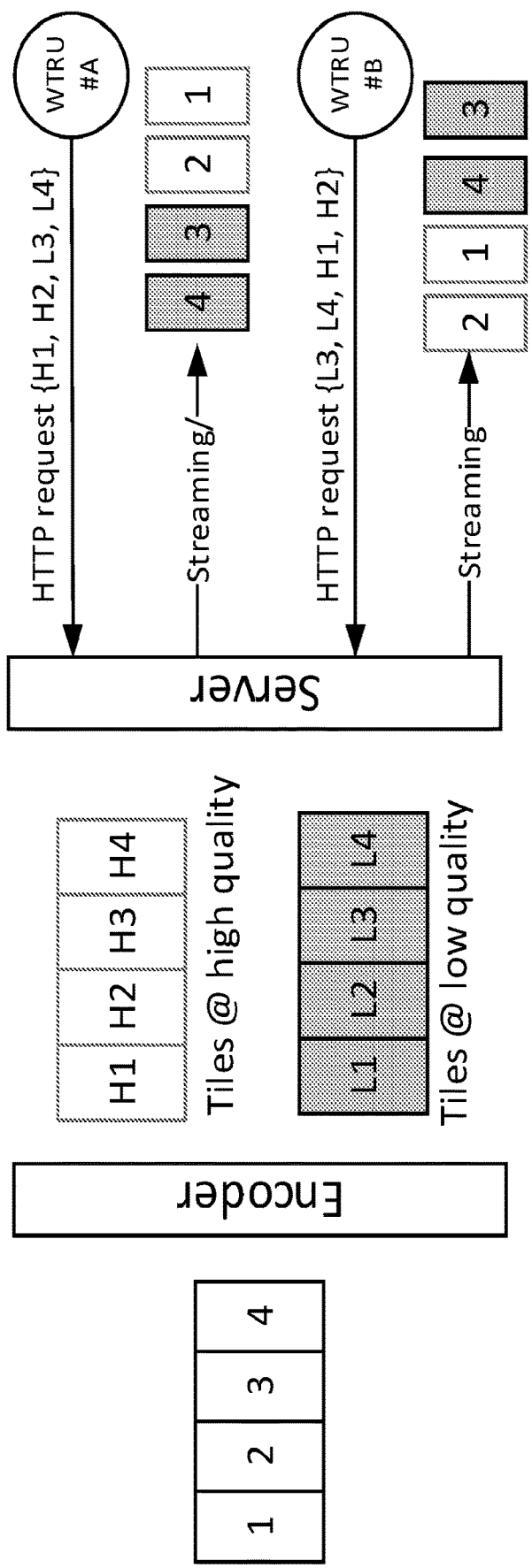
FIG. 11 illustrates an example tile-based 360-degree video hypertext transfer protocol (HTTP) request.

FIG. 11 illustrates an example tile-based 360-degree video HTTP request. As shown in FIG. 11, each of two or more WTRUs (e.g., WTRU #A and WTRU #B) sharing the same viewport may send an HTTP request. User A of WTRU #A may request one or more viewport tiles (e.g., tile H1 and/or H2) before other tiles (e.g., tile L3 and/or L4). User B of WTRU #B may request the viewport tile (e.g., tile H1 and/or H2) after some or all other tiles (e.g., tile L3 and/or L4). DASH client implementation may be configured to determine the order of viewport tiles and/or other tiles. NGN may be configured to multicast each tile to both WTRUs, for example, since the tiles are shared by both WTRUs. NGN may fetch each shared segment separately from the server as a unicast if the tile segments are not requested approximately at the same time from both users as shown in FIG. 11.

Figure 12:
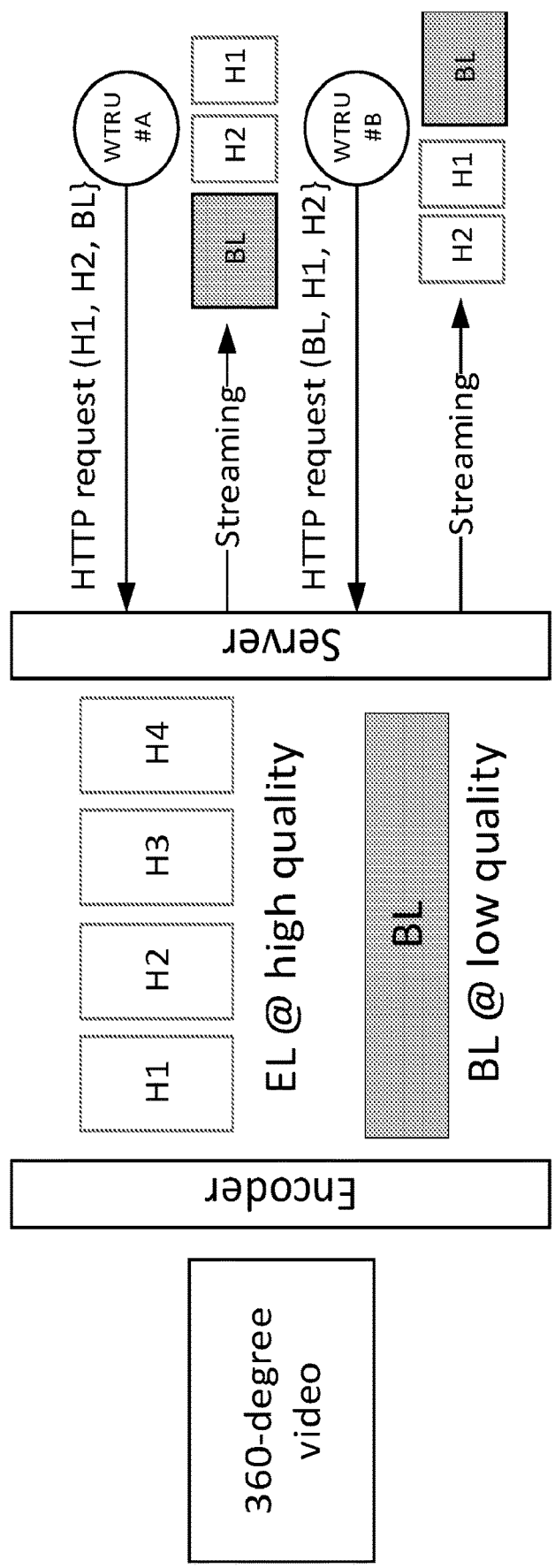
FIG. 12 illustrates an example layer-based 360-degree video HTTP request.

For layer-based approach, an inter-layer prediction may be used. For example, in layer-based approach, an inter-layer prediction may not be used. As shown in FIG. 6, the EL bitstream in FIG. 6 may be independently decodable from a BL bitstream in FIG. 6. If a BL bitstream is independently decodable, a client may choose to fetch one or more EL segments before the client may fetch one or more BL segments. For example, a client may choose to fetch one or more EL segments (e.g., before it fetches one or more BL segments), because the client may want to receive one or more viewports (e.g., the EL segments) first. For other example, other client may fetch one or more BL segments first, because the client may want to receive an entire 360-degree video first (e.g., before fetching one or more EL segments). In this case, each client's HTTP requests may be in different orders for a base layer segment and/or for an enhancement layer segment, as shown in FIG. 12. For example, FIG. 12 illustrates an example layer-based 360-degree video HTTP request. As shown in FIG. 12, WTRU #A may send a HTTP request having a base layer segment (e.g., BL) before receiving one or more enhancement layer segments (e.g., H2 and/or H1). WTRU #B may send a HTTP request having one or more enhancement layer segments (e.g., H2 and/or H1) before receiving a base layer segment (e.g., BL).

Figure 13:
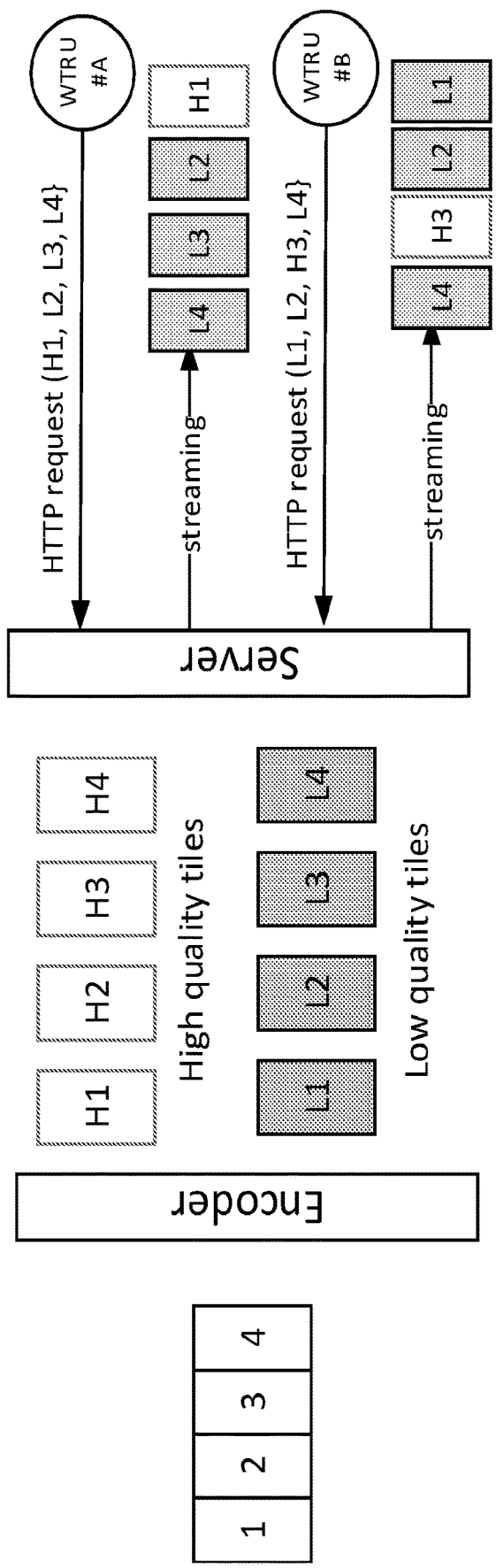
FIG. 13 illustrates an example tile-based 360-degree video HTTP request.
Figure 14:
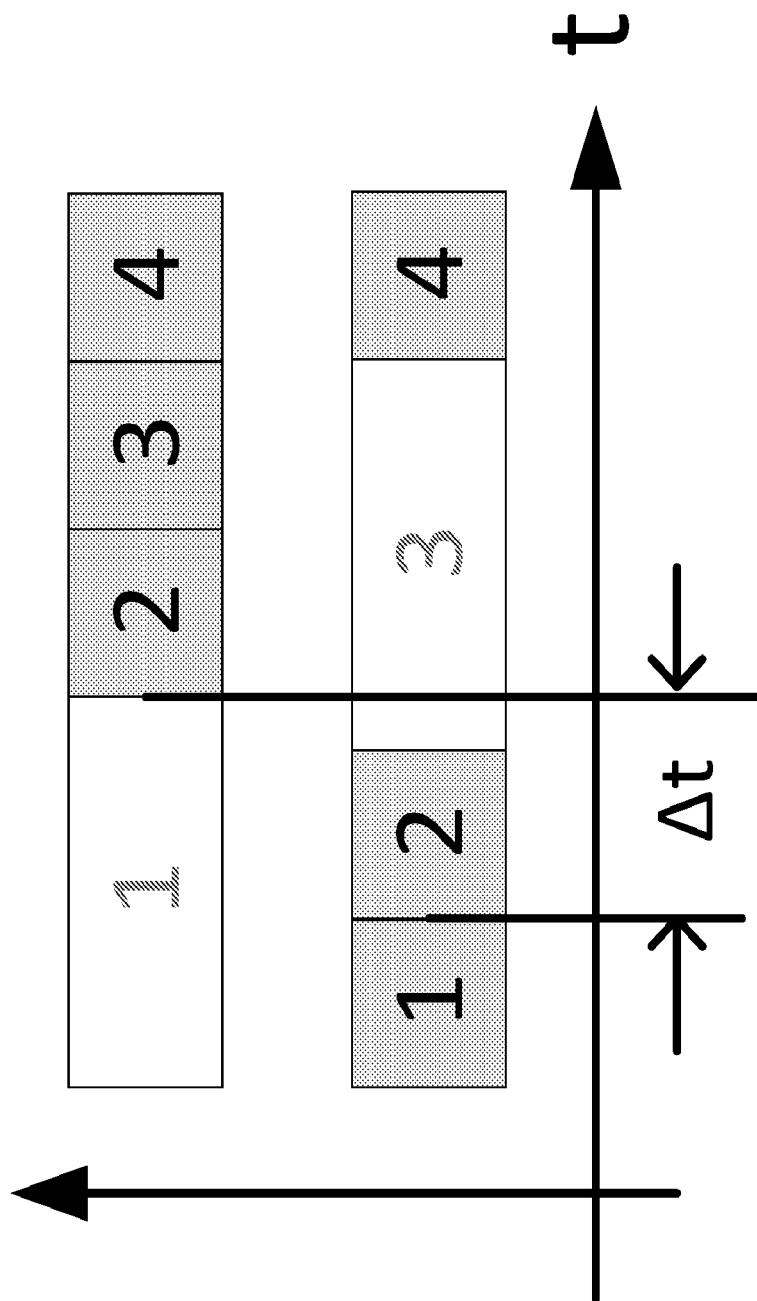
FIG. 14 illustrates an example tile-based HTTP request time.

Different viewports may be watched by different clients. FIG. 13 illustrates an example tile-based 360-degree video HTTP request. As shown in FIG. 13, two or more WTRUs (e.g., WTRU #A and WTRU #B) may have the same HTTP request order while each WTRUs may be watching different viewports. For example, WTRU #A's viewport may include tile #1 (e.g., H1), while WTRU #B's viewport may include tile #3 (e.g., H3). Tile #1 and/or tile #3 (e.g., H1 and/or H3) may be streamed via unicast as tile #1 and/or tile #3 may not be shared by both WTRUs. NGN may be configured to fetch commonly shared tile #2 and/or tile #4 (e.g., L2 and/or L4) for both WTRUs from a server once via implicit multicast. A file size of a high quality tile may be larger than a file size of a low quality tile. The different tile size may shift the HTTP request time between WTRUs (e.g., Δt) as shown in FIG. 14. FIG. 14 illustrates an example tile-based HTTP request time. As shown in FIG. 14, the HTTP request of tile #2 from WTRU #A and WTRU #B may exceed the multicast decision time windows (T<Δt). The decision time window (T) may be configured to increase so that T may be larger than Δt.

Figure 15:
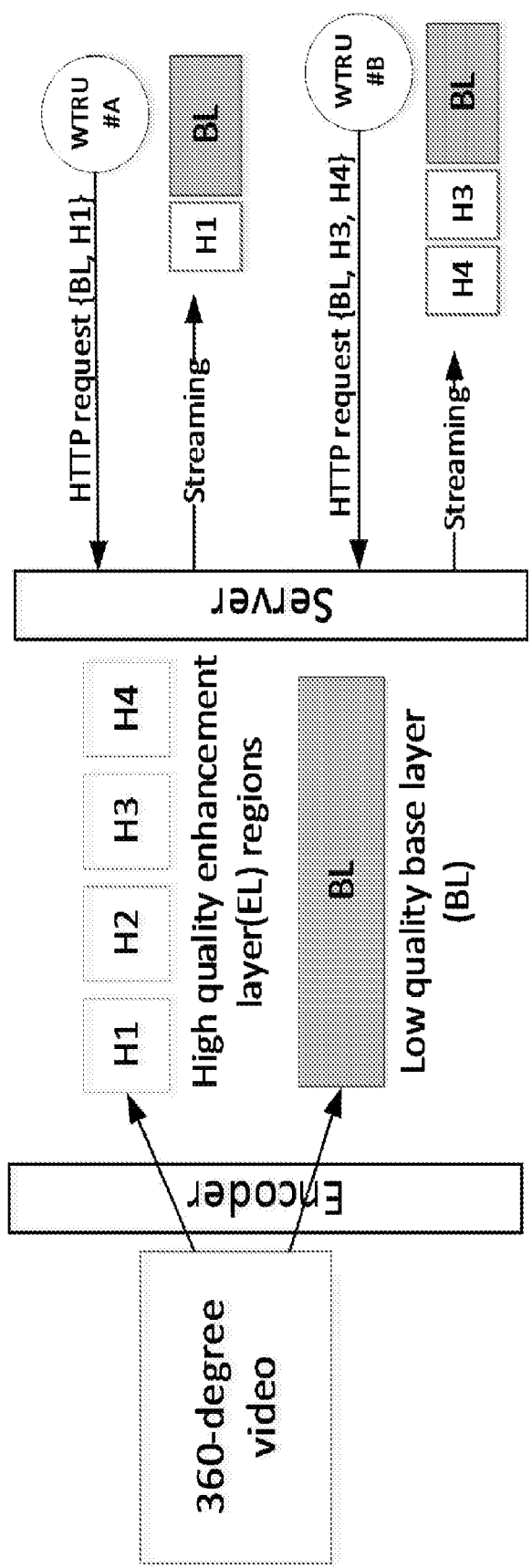
FIG. 15 illustrates an example layer-based 360-degree video HTTP request.
Figure 16:
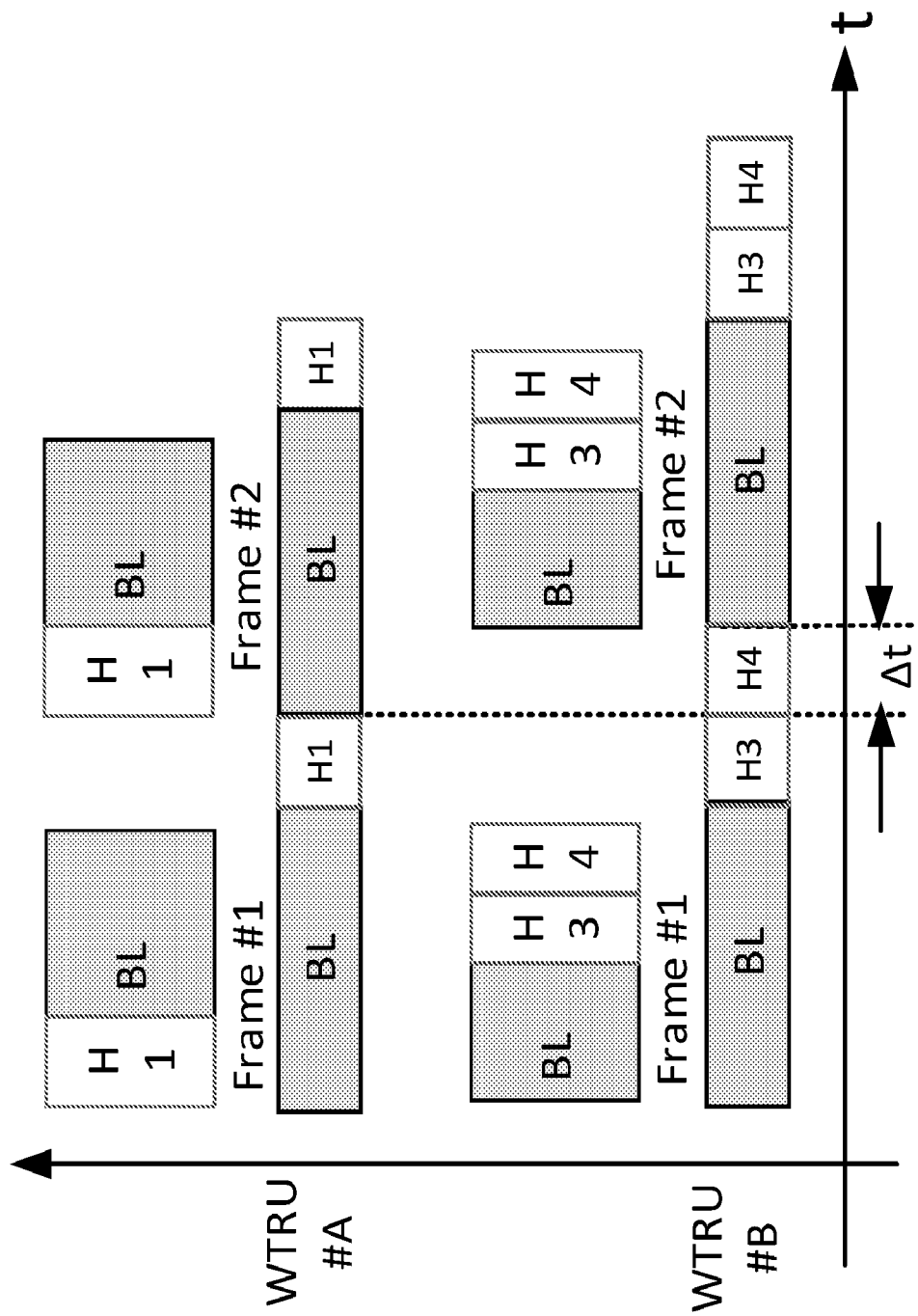
FIG. 16 illustrates an example layer-based approach HTTP request time.

FIG. 15 illustrates an example layer-based 360-degree video HTTP request. For example, user A of the WTRU #A's viewport may be inside of EL region #1 (e.g., H1), while user B of the WTRU #B's viewport may be crossing EL region #3 and #4 (e.g., H3 and H4) as shown in FIG. 15. If both users request the base layer segment before the users request the enhancement layer segments, the misalignment of the HTTP request for the base layer segment may occur as time progresses. FIG. 16 illustrates an example layer-based approach HTTP request time. As shown in FIG. 16, the requests for the BL corresponding to Frame #1 may be synchronized. The requests for the BL corresponding to Frame #2 may be out of sync.

Server and Network Assisted DASH (SAND) message and/or push strategy may be configured to deliver a 360-degree video over NGN platform when multiple VR users are watching the same 360-degree video at approximately same time.

A hybrid multicast/unicast networking architecture may be provided. For example, an entire 360-degree video may be coded into a single layer and/or single chunk file. The hybrid multicast/unicast networking architecture may achieve multicast gain when two or more users are watching the same viewport of same 360-degree video at approximately the same time.

A viewport adaptive streaming approach may not be able to achieve sufficient multicast gain even though WTRUs may share some same segments during the viewing session, because the client side segment requests may not be synchronized.

MPEG-DASH over HTTP/1.1 may be based on a client initiated mechanism where a client may pull (e.g., actively) media data from a server. Part 5 of DASH standard on Server and network assisted DASH (SAND) may introduce messages between DASH clients and network elements or between various network elements for efficient streaming sessions and/or efficient delivery of DASH content. SAND messages may provide signal information about real-time operational characteristics of one or more of the followings: networks, servers, proxies, caches, CDNs, DASH client's performance and status, and/or the like. The network attachment point (NAP) may use one or more messages described herein to optimize its media delivery strategy for tile-based or layer based 360-degree video streaming.

A SAND message may be used to identify multicast video segments in advance by NAP (e.g., assuming both DASH client and the NAP support DASH SAND). The NAP may be a DASH aware network element (DANE).

For a tile-based 360-degree video streaming, a DASH client may be able to determine the tile segments to be requested in advance. The DASH client may determine the tile segments to be requested in advance based on its viewing orientation, including the low quality tiles for the non-visible area and/or high quality tiles for the visible viewport. A client may use an AnticipatedRequests message to inform a network node (e.g., a server or NAP) of some or all tile segments to be requested soon. DASH SAND may offer a mechanism to allow a server to send one or more different segments and/or segments in different order from the requested segments to the client. Based on the mechanism described herein, a NAP may re-align the client requests and/or multicast commonly shared segments to one or more client WTRUs. For example, the NAP may multicast common segments requested by two or more clients having the same priority.

For example, the NAP may receive a first AnticipatedRequests message from a first video streaming device (e.g., DASH client). The first AnticipatedRequests message may indicate a first plurality of segments in a first relative priority order. The NAP may receive a second AnticipatedRequests message from a second video streaming device. The second AnticipatedRequests message may indicate a second plurality of segments in a second relative priority order. The NAP may determine a priority associated with each of the first plurality of segments, for example, based on the first relative priority order. The NAP may determine a priority associated with each of the second plurality of segments, for example, based on the second relative priority order. The NAP may determine that a segment is common among the first plurality of segments and the second plurality of segments. For example, the NAP may determine that a common segment is indicated in the first AnticipatedRequests message and the second AnticipatedRequests message. The common segment may represent a same video segment within a time window. The NAP may determine a first priority value for the common segment as indicated by (e.g., based on) the first AnticipatedRequests message and a second priority value for the common segment as indicated by (e.g., based on) the second AnticipatedRequests message. The NAP may send a request for the common segment, e.g., to a server. The NAP may receive the common segment, e.g., from the server. On a condition that the first priority value and the second priority value are the same, the NAP may multicast the common segment to the first video streaming device and the second video streaming device. On a condition that the first priority value and the second priority value are different, the NAP may unicast the common segment to the first video streaming device and the second video streaming device.

Figure 17:
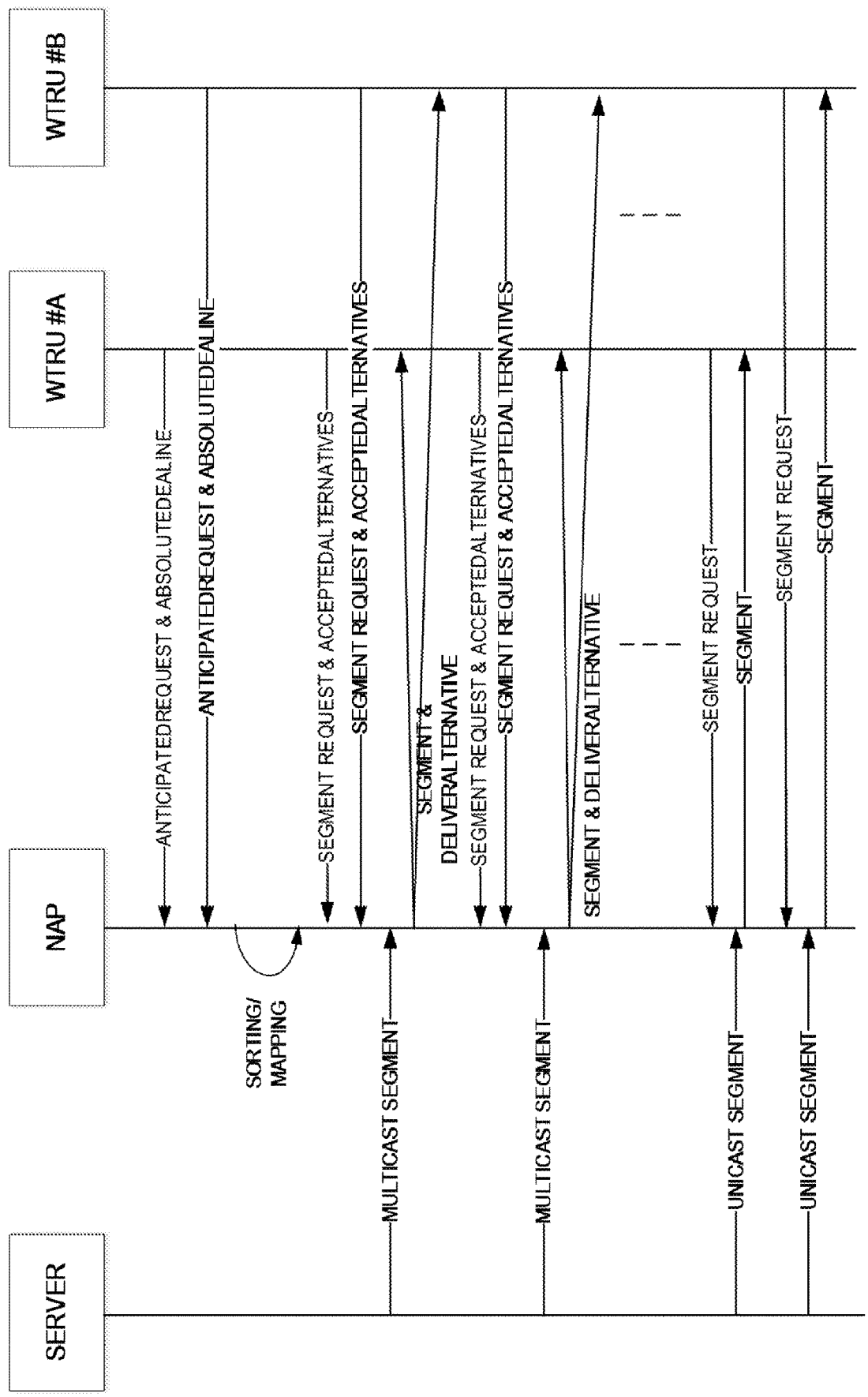
FIG. 17 illustrates an example workflow of client initiated 360-degree video streaming using multicast.

FIG. 17 illustrates an example workflow of client initiated 360-degree video streaming using multicast. For example, FIG. 17 illustrates a workflow between DASH clients (e.g., WTRU #A and WTRU #B), a NAP, and a server to introduce multicast between the server and NAP for 360-degree video streaming. Each of the clients may send an AnticipatedRequests message to the NAP. The AnticipatedRequests message may indicate some or all potential tile segments to be requested and/or the deadline to receive the requested segments. Each client may inform the NAP that the client may be willing to accept one or more DASH segment alternatives via an AcceptedAlternatives message for each segment request. The alternative segments of the AcceptedAlternatives message may include the segments of some or all tiles not being received yet. The NAP may sort out the commonly shared segments (e.g., among the clients) for multicast and/or determine one or more unique segments for unicast from the server. The NAP may map the corresponding alternative segments to each pending request. Based on the mapping results, the NAP may fetch the corresponding multicast segments once from the server and may forward the segments to WTRUs, and may fetch the corresponding unicast segments from the server and may forward to each WTRU individually.

The sorting process (e.g., performed by NAP) may include parsing AnticipatedRequests and/or AbsoluteDeadline message from multiple WTRUs. The commonly shared segments with approximately the same receiving deadline value may be identified and may put into a multicast group. Remaining segments may be put into a unicast group. An alternative response order for the pending requests may be determined.

Figure 18:
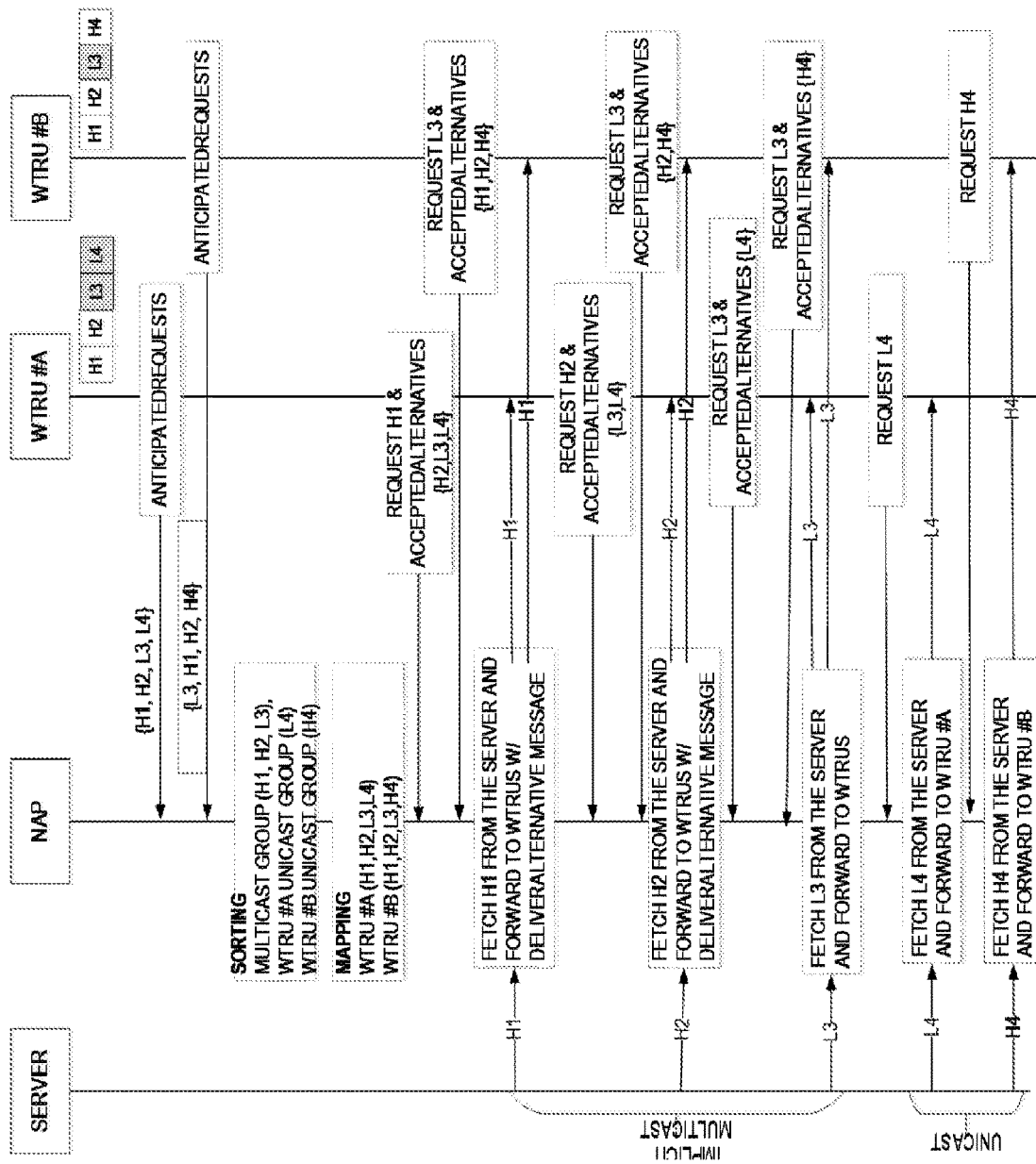
FIG. 18 illustrates an example network attachment point (NAP) sorting and mapping for tile-based 360-degree video streaming.

FIG. 18 illustrates an example NAP sorting and mapping for tile-based 360-degree video streaming. WTRU #A may be scheduled to request one or more high quality tile segments (e.g., H1 and/or H2) and one or more low quality tile segments (e.g., L3 and/or L4). WTRU #B may be scheduled to request one or more high quality tile segments (e.g., H1, H2, and/or H4) and low quality tile segments (e.g., L3). WTRU #A and/or WTRU #B may agree to accept segment alternatives. The NAP may sort out the list of anticipated requests from two or more WTRUs (e.g., WTRU #A and WTRU #B), may identify the common requests (e.g., H1, H2, and/or L3) for multicast, and may identify unique requests (e.g., L4 and/or H4) for unicast. The segment alternative for each request may be determined, and NAP may fetch the multicast segment(s) once from a server. When NAP receives the segment request and/or AcceptedAlternatives message from WTRUs, NAP may forward the segment alternatives to WTRUs based on the mapping result with the DeliveredAlternative message to inform the WTRUs that the actual delivered content or actual content to be delivered.

Each client may put some or all anticipated tile segments not being received in AcceptedAlternatives, and a server may deliver segments (e.g., exact segments) as the client requested. A client may add a low quality representation for the corresponding high quality tile requested into the AcceptAlternatives message. In the example shown in FIG. 18, a client #B may add a low quality tile segment (e.g., L4) that correspond to a high quality segment (e.g., H4) in a AcceptedAlternatives message. The NAP may fetch L4 as a multicast segment and may forward the multicast segments to client #A and #B without sending H4 via unicast separately.

In this way, a NAP may fetch some or all tiles (e.g., H1, H2, L3, and/or L4) from a server once and/or may deliver the fetched tiles to WTRU #A and/or WTRU #B.

Figure 19:
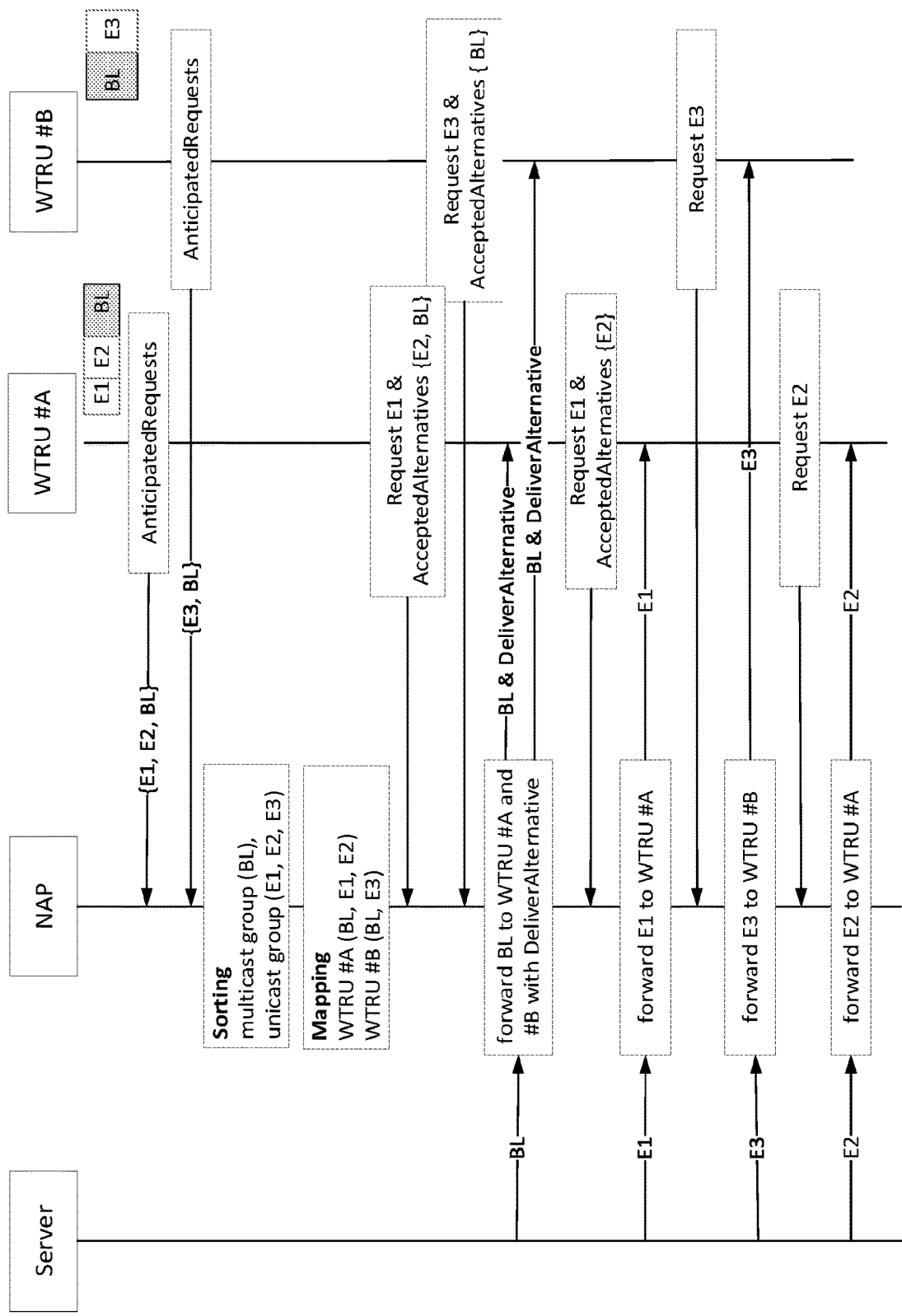
FIG. 19 illustrates an example NAP sorting and mapping for layer-based 360-degree video streaming.

The same strategy may apply to a layer-based 360-degree viewport adaptive streaming approach, where a client may request the same base layer segment and/or different enhancement viewport segments. The base layer segment may be a multicast segment to be delivered before other enhancement segments. FIG. 19 illustrates an example NAP sorting and mapping for layer-based 360-degree video streaming. As shown in FIG. 19, two or more WTRUs may have the same base layer segment (e.g., BL) request and one or more different enhancement layers (e.g., E1, E2, and/or E3). NAP may sort out a base layer segment for multicast fetch and may sort enhancement layer segments for unicast fetch. The DeliveredAlternative message may inform actual content to WTRUs.

Depending on a segment size, available network bandwidth, and/or client request scheduling, a client HTTP request time may exceed the original estimated targetTime as signaled in a AnticipatedRequests message. The NAP may detect and/or determine such a case based on information signaled in the AnticipatedRequests messages. If a NAP decides that the client's request will be out of sync with the request from other clients, the NAP may treat such out-of-sync request as a unicast. For example, the NAP may fetch the segment from a server and may forward the fetched segment to the affected (e.g., out of sync) client separately from the other clients.

A NAP may store segments in a buffer, which may be a local buffer (e.g., NAP's local buffer). The NAP may receive one or more AnticipatedRequests messages from some or all video streaming devices (e.g., WTRUs). The NAP may identify a number of requests from multiple clients for one or more segments (e.g., shared segments). For the segments to be shared by two or more WTRUs, the NAP may fetch the segment once from a server and may store the segment in a buffer (e.g., NAP's local buffer) for future requests. The NAP may free the storage of a particular segment if no more future request of such segment is pending. For the segments to be requested by a WTRU, the NAP may fetch the segment from a server and may forward them to the corresponding WTRU.

Figure 20:
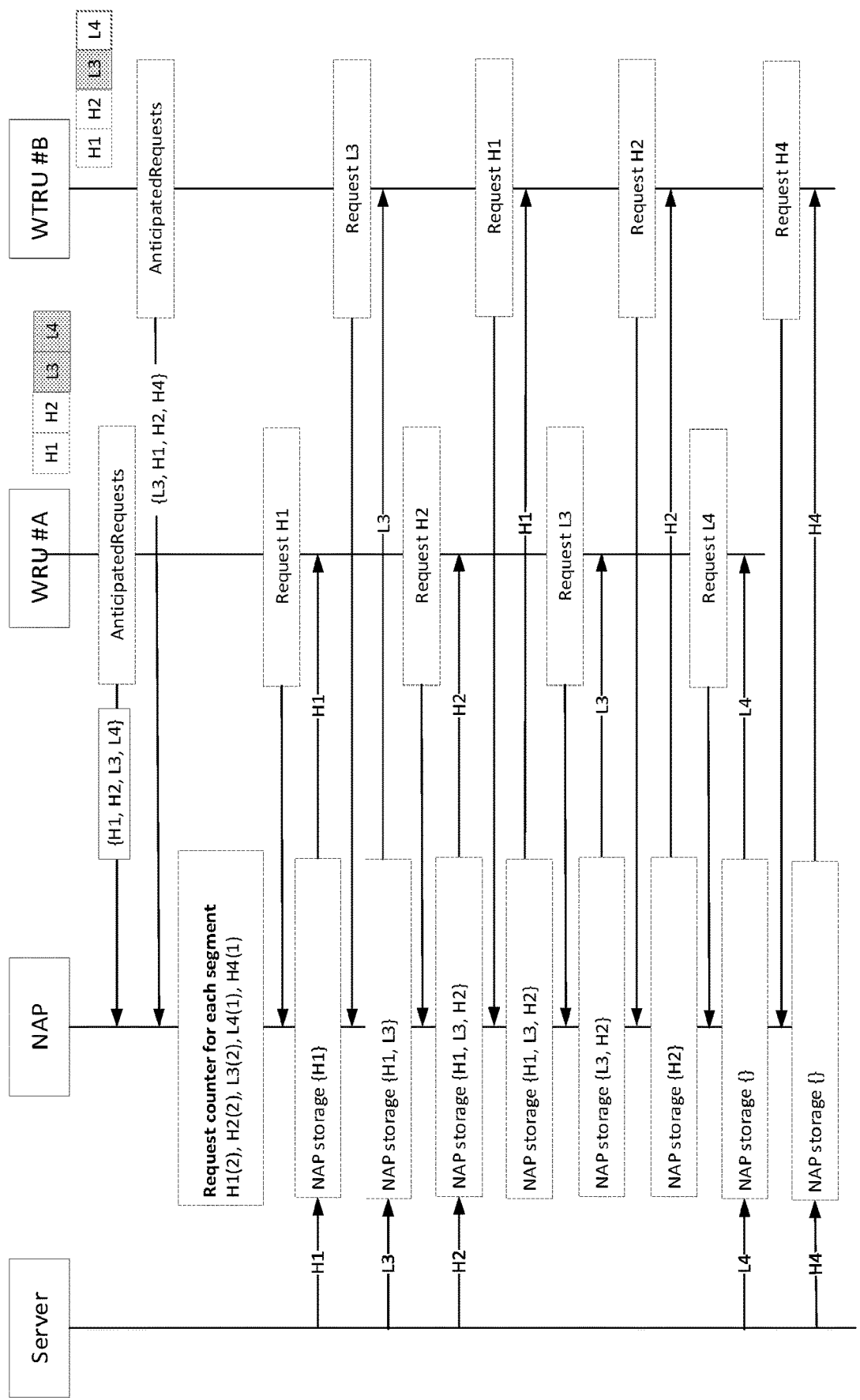
FIG. 20 illustrates an example multicast design with Anticipated Requests and local storage buffer.

FIG. 20 illustrates an example multicast design with AnticipatedRequests and local storage buffer. An example multicast shown in FIG. 20 may be combined with NAP sorting and mapping example for tile-based 360-degree video streaming shown in FIG. 18. Based on the AnticipatedRequests messages from two or more WTRUs (e.g., WTRU #A and #B), the NAP may determine that one or more tile segments (e.g., H1, H2, and/or L3) are requested by both WTRUs, and one or more tile segments (e.g., L4 and/or H4) may be requested once from either WTRU #A or WTRU #B. When a NAP receives WTRU #A's request for segment H1, the NAP may fetch the H1 from the server and may forward it to WTRU #A. The NAP may be configured to store the fetched H1 in its local buffer for the pending request from WTRU #B (e.g., a request counter may be used to determine the number of pending requests). The same procurement procedure may be carried out for tiles such as H2 and/or L3. When the stored tile segment is requested by other WTRU, NAP may forward the stored tile segment (e.g., from its local buffer) to the corresponding WTRU without fetching the requested tile segment from the server again. By configuring to use a local buffer, the WTRUs may share the same tiles and may not request the same tile at approximately same time. The tile-based approach described herein may apply to a layer-based viewport adaptive streaming.

For tile-based 360-degree video streaming, a client (e.g., a client WTRU) may be able to identify a viewport. The client may be a video streaming device. The video streaming device may be configured with a wired connection as described herein. For example, the client may receive a 360-degree video stream from a network node. The client may identify the viewport based on a location of the 360-degree video stream which the user is viewing and/or a region of interest associated with the 360-degree video stream. The client may request one or more segments (e.g., high quality viewport segments). The client may request the one or more segments based on the identified viewport. The client may determine to request in advance a plurality of segments of the 360-degree video stream. For example, the client may determine to request a first video segment of the 360-degree video stream and a second video segment of the 360-degree video stream. The client may determine to request the first video segment and the second video segment based on the viewport. A client may request a viewport tile segment prior to other tiles, for example, to guarantee the viewport tile may be delivered before the presentation deadline. For example, a client may prioritize a viewport tile segment over a non-viewport tile segment. With multicast strategy using SAND message described herein, the corresponding viewport request may be postponed.

Figure 21:
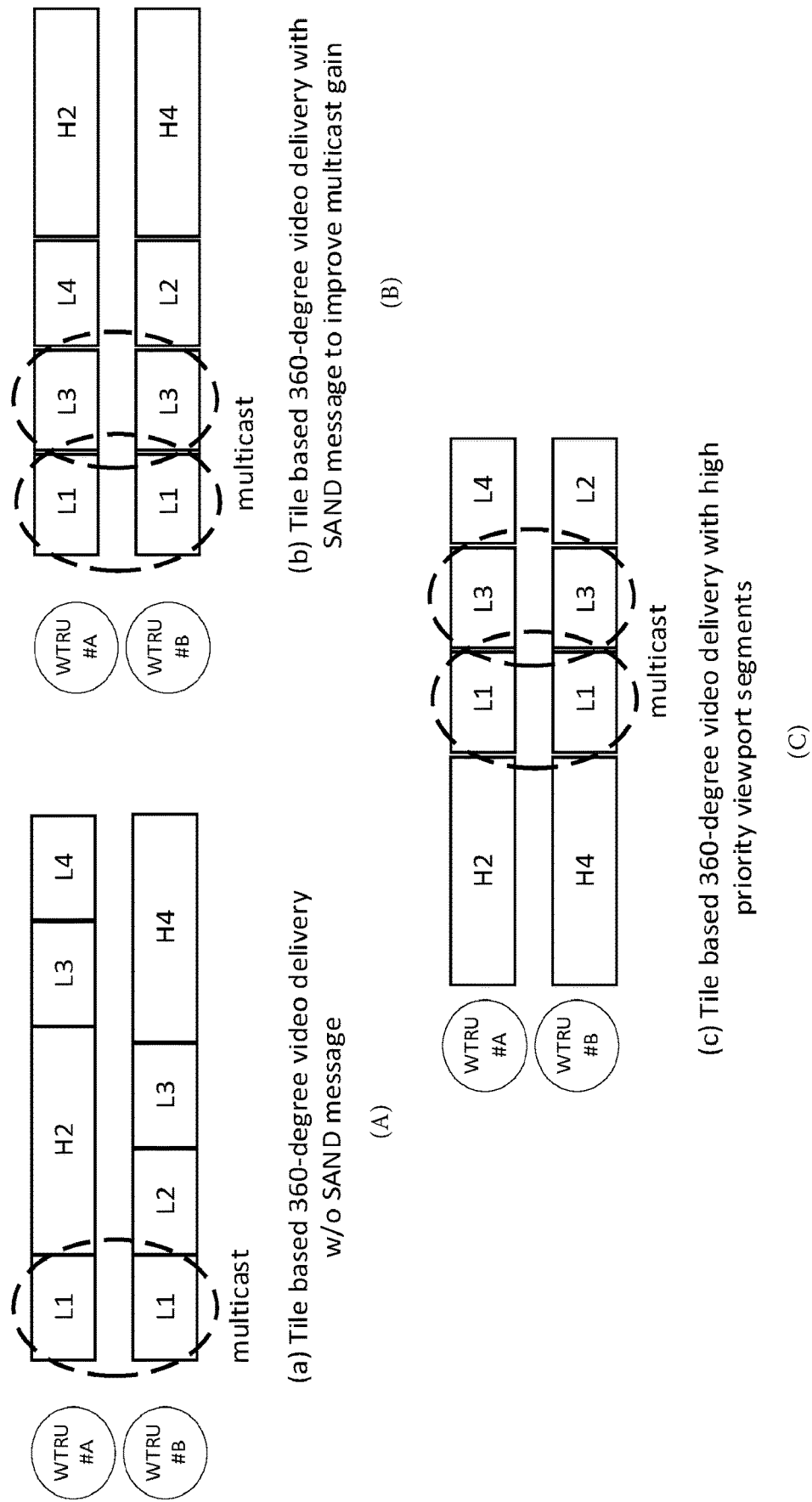
FIGS. 21A-C illustrate examples of tile-based 360-degree video segment deliveries.

FIGS. 21A-C illustrate examples of tile-based 360-degree video segment deliveries. For example, FIG. 21A shows tile-based 360-degree video delivery without a SAND message. As shown in FIG. 21A, DASH request order may be initiated by a client, where a 360-degree frame may be divided into one or more tiles (e.g., 4 tiles). Each tile may be encoded into one or more low quality tiles (e.g., L1, L2, L3, and/or L4) and/or high quality tiles (e.g., H1, H2, H3, and/or H4). WTRU #A may request a high quality viewport (e.g., H2) and may request other tiles (e.g., L1, L3 and/or L4) in low quality. WTRU #B may request a high quality viewport (e.g., H4) and may request other tiles (e.g., L1, L2 and/or L3) in low quality. Two or more WTRUs (e.g., WTRU #A and WTRU #B) may request tiles in the same order. If both WTRUs request tiles in the same order, tile L1 may be fetched using an implicit multicast via NAP. FIG. 21B may be an example of tile-based 360-degree video delivery with SAND message. In FIG. 21B, the segment delivery may be re-ordered and one or more tiles (e.g., tiles L1 and/or L3) may be delivered via a multicast. The viewport segment (e.g., H2 and/or H4) may be postponed to the last segment to be delivered. The approach shown in FIG. 21B may not be able to deliver the viewport tiles in time if the network bandwidth drop down unexpectedly. FIG. 21C illustrates an example tile-based 360-degree video delivery with high priority viewport segments. As shown in FIG. 21C, the viewport tile may be delivered prior to other tiles in the invisible area (e.g., to guarantee the viewport delivery).

The NAP may not identify a viewport segment from a client's request, for example, when the client may request a number of tiles with the same quality (e.g., due to the bandwidth condition). A SAND message indication may allow one or more DASH clients to indicate a segment priority to a network node (e.g., a NAP). For example, a client WTRU (e.g., such as a DASH client) may determine a priority associated with one or more video stream segments. A client WTRU may be a video streaming device. The video streaming device may be configured with a wireless and/or wired connection as described herein. The client WTRU may determine the priority based on a viewport associated with the WTRU and the video stream. For example, the client WTRU may determine the viewport (e.g., based on an orientation of the client WTRU). The client WTRU may determine the priority based on a time preference, a quality preference, and/or a location relative to the viewport. For example, a higher priority may be determined for a segment to be displayed before another segment. A higher priority may be determined for a segment to be displayed at a higher quality than another segment. A higher priority may be determined for a segment to be displayed within and/or in close proximity to the viewport. The client WTRU may indicate the priority of the one or more video stream segments. The client WTRU may indicate the priority of the one or more video stream segments to a network node (e.g., the NAP). The priority signaling may be used by the client to indicate its viewport segment(s) to a network node.

For example, a video streaming device (e.g., a client WTRU) may indicate a priority of one or more segments via an AnticipatedRequests message. As an example, a priority parameter may be included in a AnticipatedRequests message, as shown in Table 7. Table 7 shows an example priority parameter to AnticipatedRequests message. As another example, the AnticipatedRequests message may indicate the priority of the one or more segments by listing the one or more segments in decreasing relative priority. Table 8 shows an example AnticipatedRequests message indicating the priority of segments.

The priority parameter (e.g., value) may indicate a relative priority order of an associated segment to other segments of the same AnticipatedRequests. When a DASH client announces to a NAP which specific set of segments it is interested in, the DASH client may inform the NAP the priority of each segment. The Priority value may be used to signal the delivery order and/or time preference (e.g., client may prefer to receive high priority segments at the earliest possible time) or the quality preference (e.g., client may prefer to receive high quality segments instead of low quality segments), or a combination of delivery preference and quality preference. For tile-based viewport adaptive streaming, a client may include the segments of some or all tiles into a AnticipatedRequests message and may set a high priority value to the viewport segment(s) and low priority value to other segments.

When the NAP receives the AnticipatedRequests message from a client, the NAP may pre-fetch the high Priority viewport segments in order to minimize the delivery latency. The NAP may identify one or more common segments indicated by multiple clients (e.g., via AnticipatedRequests messages) as having the same priority. For example, the one or more common segments may have the same priority within a time window. The NAP may determine to multicast the one or more common segments to the multiple clients, for example, based on the one or more common segments having the same priority. The NAP may unicast, to the multiple clients, one or more segments having different priorities. When the NAP receives the AnticipatedRequests messages from multiple clients, the NAP may choose not to pre-fetch the most commonly requested segments that may be in a low priority and may pre-fetch the commonly requested high priority segments first in order to minimize the delivery latency. The pre-fetch scheduling may be different for different applications and/or different implementations.

TABLE 7

Example priority parameter to AnticipatedRequests message

| Parameter | Type | Cardinality | Description |
| --- | --- | --- | --- |
| AnticipatedRequests | object | 1 | |
|   request | array | 1...N | List of anticipated requests |
|     sourceUrl | url | 1 | URL for a segment of a given representation. |
|     range | string | 0...1 | This may be a byte range specification when the segment is a part of the content referred to by sourceUrl. |
|     targetTime | date-time | 0...1 | Time at which the DASH client may expect to request the resource identified by sourceUrl. |
|     Priority | Integer | 0...N | A value (e.g., optional value) describing the priority of the segment referred to by sourceUrl. Priority's scale may be left to implementation. |

As another example, the AnticipatedRequests message may indicate (e.g., imply) the priority of each request, for example, associated with sourceUrl. The AnticipatedRequests message may indicate a relative priority order (e.g., as determined by the client WTRU). For example, the segments listed in the AnticipatedRequests message may be listed in an order of priority (e.g., the relative priority order). The client WTRU may determine the relative priority order based on the determined priority for the segments listed in the AnticipatedRequests message. The video segments may be listed in the AnticipatedRequests message in decreasing relative priority. For example, a higher priority segment (e.g., associated with sourceUrl) may be listed before one or more lower priority segments. A receiving entity, which may be a network node such as a NAP, may determine the priority based on the order of the list received. WTRU(s) may determine the order of list (e.g., priority order) before sending the list to the NAP. Table 8 shows an example of the ordered list of AnticipatedRequests message implying the priority.

TABLE 8

Example ordered list of AnticipatedRequests message implying priority

| Parameter | Type | Cardinality | Description |
| --- | --- | --- | --- |
| AnticipatedRequests | object | 1 | The ordered list of anticipated requests. Higher priority request may be listed first. |
|   request | array | 1...N | List of anticipated requests |
|     sourceUrl | url | 1 | URL for a segment of a given representation. |
|     range | string | 0...1 | This may be a byte range specification when the segment is a part of the content referred to by sourceUrl. |
|     targetTime | date-time | 0...1 | Time at which the DASH client may expect to request the resource identified by sourceUrl. |

As another example, a ViewportRequests status message may be signaled to announce to a NAP which specific set of viewport segments it may likely be to watch soon. Table 9 shows an example data representation of a ViewportRequests message. Each viewport segment may be specified by sourceUrl with a byte range and/or an absolute deadline to be received.

TABLE 9

Example data representation of ViewportRequests message

| Parameter | Type | Cardinality | Description |
| --- | --- | --- | --- |
| ViewportRequests | object | 1 | |
|   List | array | 1 ... N | List of anticipated requests |
|     sourceUrl | url | 1 | URL for a segment of a given representation. |
|     range | string | 0 ... 1 | This may be a byte range specification when the segment is a part of the content referred to by sourceUrl. |
|     deadline | date-time | 0 ... 1 | Absolute deadline for the segment to be available in the receiver. |

With a ViewportRequests SAND message described herein, a NAP may schedule a multicast request order to guarantee an on-time delivery of the most desirable viewport segments.

AcceptedAlternatives and/or DeliveredAlternative messages may be exchanged between a NAP and DASH clients when an alternative segment, rather than the requested segment, is to be delivered. A client may request one or more segments in a desirable order as suggested by a NAP, for example, to avoid message exchange overhead. SAND Parameters Enhancing Reception (PER) may be configured to send from a NAP to DASH clients for 360-degree video streaming.

Table 10 shows example parameters of RequestsOrder PER message. The RequestOrder PER message may allow a NAP to signal the set of segments to be requested in a preferred order as explicitly signaled in a message from the DASH client.

TABLE 10

Example parameters of RequestsOrder PER message

| Parameter | Type | Cardinality | Description |
| --- | --- | --- | --- |
| RequestsOrder | object | 1 | The ordered list of preferred requests |
|   request | array | 1 ... N | List of preferred request |
|     sourceUrl | url | 1 | URL for a segment of a given representation. |
|     targetTime | date-time | 0 ... 1 | Time at which the DASH client may expect to request the resource identified by sourceUrl. |

As described herein, NAP may foresee one or more pending requested segments signaled in a AnticipatedRequests message from a WTRU. Based on the requests frequency, size, and/or absolute receiving deadline of each segment, the NAP may sort out the requested segments. For example, the NAP may sort out the expected most requested segment, the expected second most requested segment, and so on until the expected least requested segment. NAP may announce the expected segment request order to each WTRU via a RequestsOrder message based on the sort and/or analysis result. When the WTRU follows the expected segment request order, an extra SAND messages, such as AcceptedAlternatives and/or DeliveredAlternative, may be skipped and/or bypassed.

Table 11 shows an example where a 360-degree video may be divided into 4 tiles: including one or more high quality tile segments (e.g., H1, H2, H3, and/or H4) and one or more low quality tile segments (e.g., L1, L2, L3, and/or L4). The most frequently requested segment may be L4. The second most frequently requested segment may be H2, H3 and/or L1. The least frequently requested segment may be H1, L2 and/or L3. The priority of viewport tiles H1, H2 and H3 may be higher (e.g., marked as * in Table 11) than the remaining tiles as described herein. Based on the sorting result, a server may send a PER message RequestsOrder to announce the preferred requesting order as shown in Table 11 to each WTRU.

TABLE 11

Segments sorting example

| WTRU | #A | #B | #C | Ordered segments based on priority and request frequency |
|---|---|---|---|---|
| AnticipatedRequests | {H1*, H2*, L3, L4} | {L1, H2*, H3*, L4} | {L1, L2, H3*, L4} | H2 (2) |
| RequestsOrder | {H2*, H1*, L4, L3} | {H2*, H3*, L4, L1} | {L2, H3*, L4, L1} | H3 (2) L4 (3) L1 (2) ... |

Figure 22:
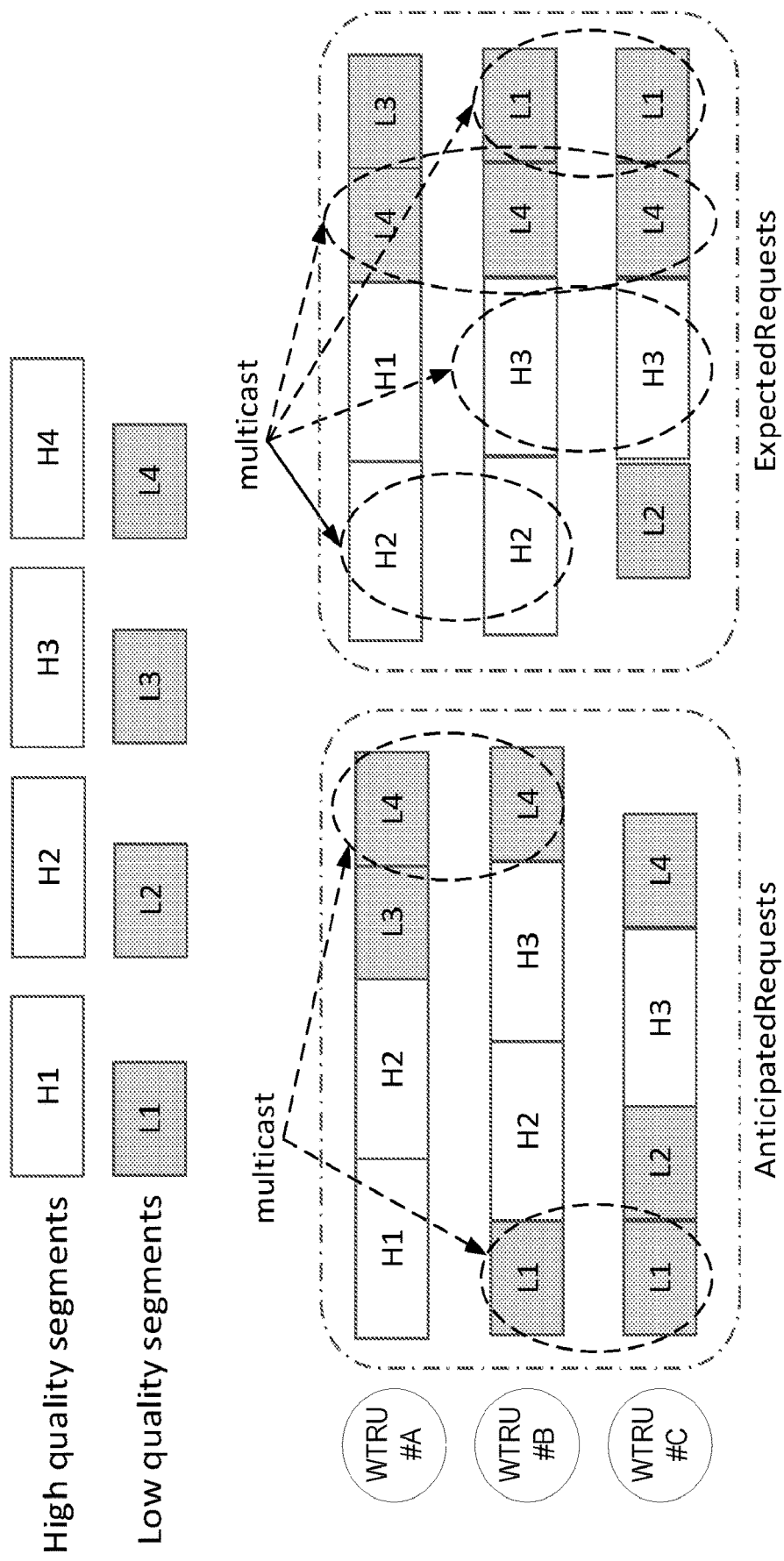
FIG. 22 illustrates an example multicast gain of a server and network assisted dynamic adaptive streaming over HTTP (SAND) Request Order message.

FIG. 22 illustrates an example multicast gain of SAND RequestOrder message. As shown in FIG. 22, more segments may be delivered via multicast by using RequestsOrder message.

Figure 23:
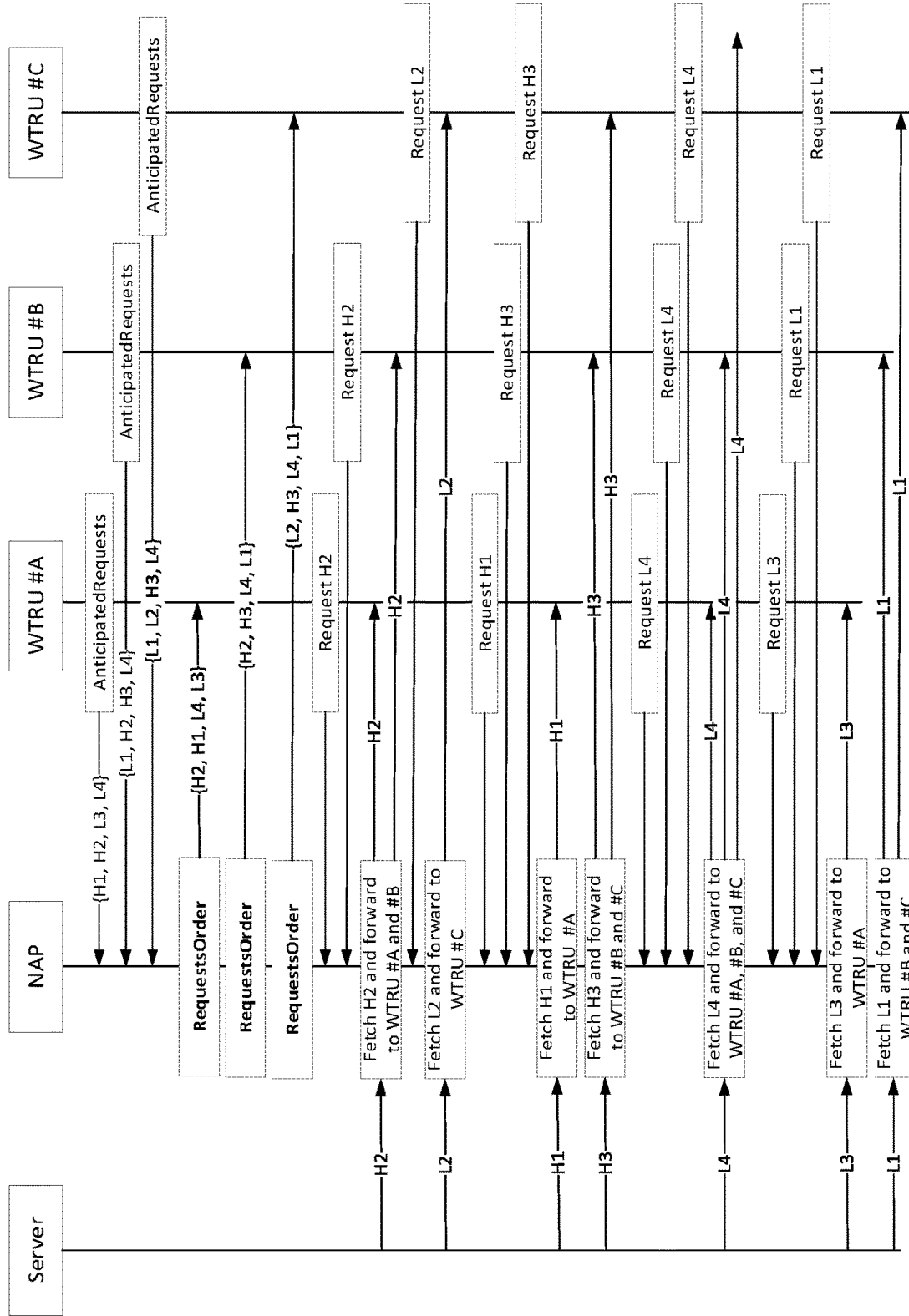
FIG. 23 illustrates an example workflow of Request Order message.

FIG. 23 illustrates an example workflow of RequestOrder message. As shown in FIG. 23, a server, a NAP, and/or two or more WTRUs may use RequestOrder message(s) from the example of Table 11. A NAP may receive an AnticipatedRequests message from some or all WTRUs and may identify an optimal request order for each WTRU, for example, based on the AnticipatedRequests message(s) from some or all WTRUs. The NAP may send the RequestsOrder message to indicate the preferred request order to each WTRU. If each WTRU follows the RequestsOrder message to request each segment in the expected order, the NAP may fetch the commonly shared segments (e.g., H2, H3, L4 and/or L1) from a server once and may forward the shared segments to multiple WTRUs. The SAND message exchange overhead may be reduced.

A server may push a resource to a client without the client asking for the resource. A server may be making an assumption that pushing a resource may be desirable. The server push may reduce a roundtrip of delay and may achieve lowest latency (e.g., which may be one of preferred components for immersive VR experience).

Figure 24:
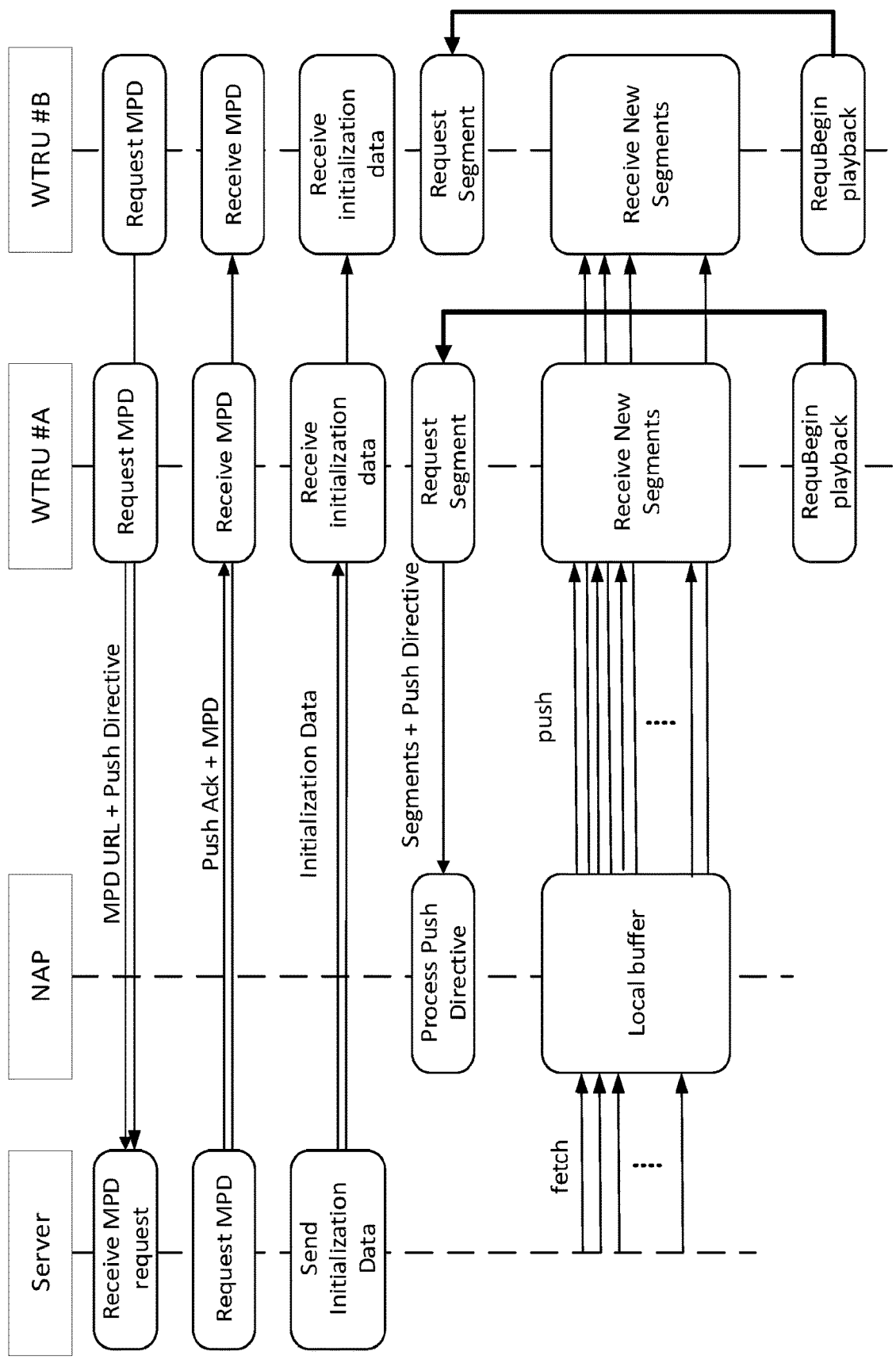
FIG. 24 illustrates an example workflow of multicast design for server push.

A NAP may utilize a server push protocol to reduce the latency. FIG. 24 illustrates an example workflow of multicast design for server push. As shown in FIG. 24, two or more WTRU clients (e.g., WTRU #A and WTRU #B) may request a MPD. The media segments may be delivered with a push strategy. Initialization data may be pushed in response to a push strategy associated with the MPD request. When the requested MPD has been received, the client may start requesting one or more video segments from the server with the respective DASH segment URL and/or a segment push strategy. The push strategy type may be, but not limited to, "urn:mpeg:dash:fdh:2016:push-list", "urn:mpeg:dash:fdh:2016:push-next" or "urn:mpeg:dash:fdh:2016:push-template" to explicitly signal the segments to be pushed during a push transaction. The NAP may parse the push directive value to sort out commonly requested segments shared by WTRUs and unique segments for each WTRU. The NAP may fetch the commonly requested segment from the server (e.g., once) and store it in the local buffer. Based on the explicitly signaled URLList or URL template, NAP may push the stored segment to WTRUs during a push transaction. For the unique segments requested by a WTRU, WTRU may fetch the segment from the server as unicast and may push the unique segment to the corresponding WTRU instantly.

Figure 25:
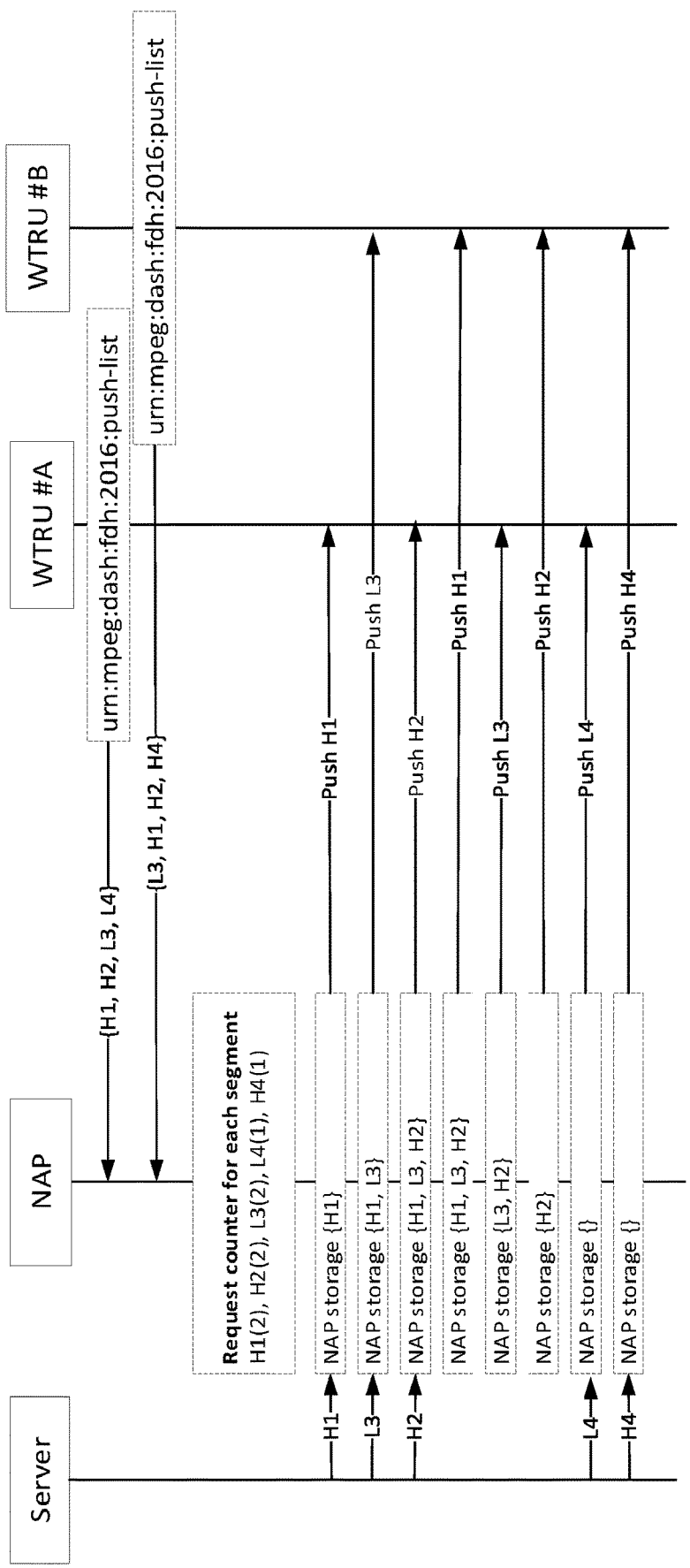
FIG. 25 illustrates an example NAP multicast decision for tile-based 360-degree video streaming via server push.

FIG. 25 illustrates an example NAP multicast decision for tile-based 360-degree video streaming via server push. As shown in FIG. 25, NAP may identify the tile based 360-degree video segments for multicast push and/or unicast push. The NAP may receive and may parse the push directive with a list of segment URLs from two or more WTRUs (e.g., WTRU #A and WTRU #B). The NAP may identify one or more commonly shared segments (e.g., H1, H2, and/or L3) to be fetched from a server once and may store the commonly shared segments in a local buffer (e.g., buffer in the NAP) until no more future request is pending. The NAP may push one or more commonly shared segments from the local buffer to each WTRU based on the URLList and/or URL template signaled in the push directive.

Figure 26:
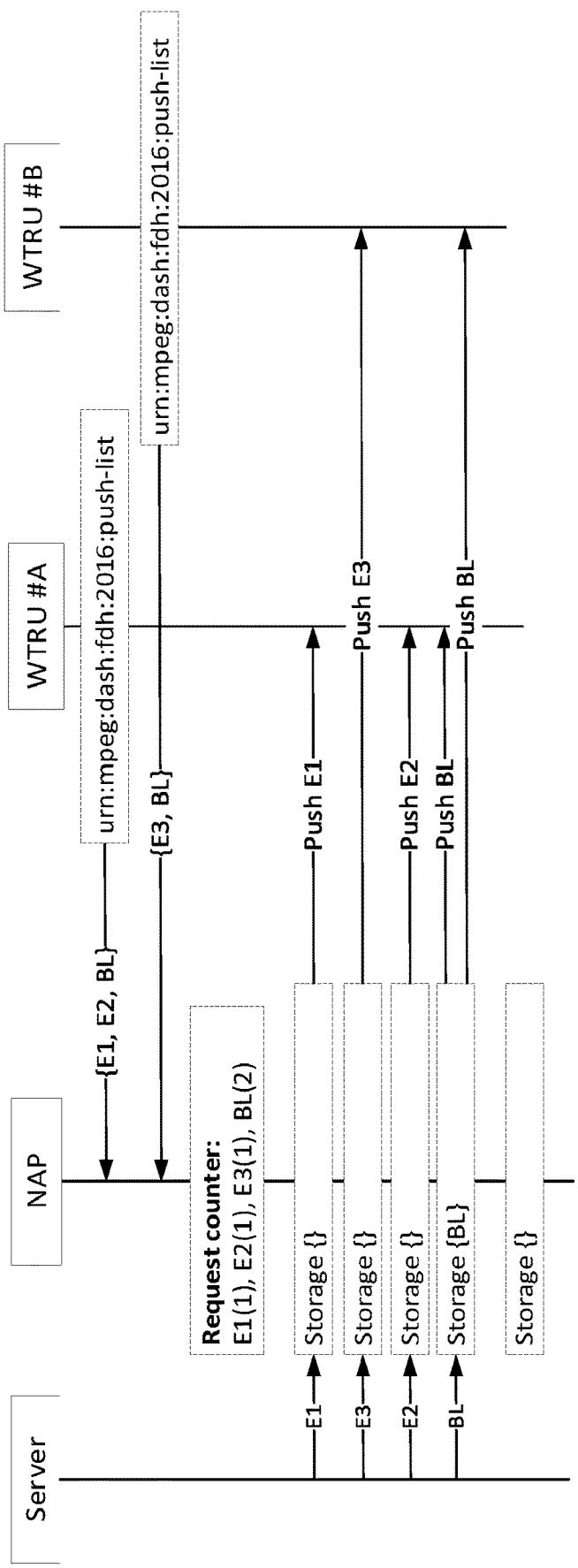
FIG. 26 illustrates an example NAP multicast decision for layer-based 360-degree video streaming via server push.

FIG. 26 illustrates an example NAP multicast decision for layer-based 360-degree video streaming via server push. As shown in FIG. 26, NAP may identify the layer based 360-degree video segments for multicast and/or unicast fetch from a server. The NAP may receive and may parse the push directive with a list of segment URLs from two or more WTRUs (e.g., WTRU #A and WTRU #B). The NAP may identify one or more commonly shared base layer segments (e.g., BL) for an implicit multicast fetch and may identify one or more individual enhancement layer segments for each WTRU (e.g., E1 and E2 for WTRU #A and E3 for WTRU #B) for a unicast fetch. The NAP may fetch one or more commonly shared BL segments once from the server and may store one or more BL segments in a local buffer (e.g., NAP's local buffer). The NAP may push BL segment from the local buffer to each WTRUs based on the URL list and/or URL template explicitly signaled by the WTRUs.

NAP may store segments locally. A server push specification may specify that a client may use a push type (e.g., urn:mpeg:dash:fdh:2016:push-list, urn:mpeg:dash:fdh:2016:push-next, and/or urn:mpeg:dash:fdh:2016:push-template) to explicitly signal the segments to be pushed during a push transaction. Table 12 shows a segment push order example signaled by different push types.

TABLE 12

Segment push order example

| Push type | Example | Push order |
|---|---|---|
| Push-list | '../rep1/segment1650.mp4;../rep1/segment1900.mp4;../rep 1/segment3500.mp4' | segment1650.mp4, segment1900.mp4, segment3500.mp4 |
| Push-next | path = ../rep1/segment1 accept-push-policy = "urn:mpeg:dash:fdh:2016:push-next"; 3;q=1.0 | segment2, segment3, segment4 |
| Push-template | '../rep1/segment{%02d}.mp4': {10, 12, 14} | segment10.mp4, segment12.mp4, segment14.mp4 |

The SAND message may allow a server to deliver an alternative segment rather than the requested segment to the client. Server push may be configured to act similarly. For example, the server may push the segments that may be different from what is signaled in the push type. The server may determine which segment to push first based on at least one of the server load, network conditions, and/or importance of the particular segments.

The format of a PushDirective may be configured as follows:

```
PUSH_DIRECTIVE = PUSH_TYPE [OWS ";" OWS QVALUE]
PUSH_TYPE = <an example of a PushType (e.g., may be provided in Table 5 and/or Table 6. >
  QVALUE = <a qvalue may be defined as:
  Weight = OWS ";" OWS "q=" qvalue
  qvalue = ( "0" [ "." 0*3DIGIT ] )
    / ( "1" [ "." 0*3("0") ] ) >
```

Additional PUSH_ORDER may indicate whether the segments may be pushed in an exact order as explicitly signaled in a push type or may be determined by a NAP. ORDER=<An example PushOrder defined in Table 13>

The PushDirective with PUSH_ORDER described herein may apply to network elements supporting DASH server push such as edge server, CDN server, or the origin server. Table 13 shows example valid values for PUSH_ORDER.

TABLE 13

| Valid values for PUSH_ORDER | |
|---|---|
| PushOrder | Description |
| Explicit | Indication that the segments as described by the PushType may be pushed in the exact order as signaled. A server receiving such PushOrder may push the segments in the order of the segment description in the PushType. |
| Flexible | Indication that the segments as described by the PushType may be pushed in an alternative order to be determined by a server. A server receiving such PushOrder may push the segments in different order of the segment description in the PushType. |

Table 14 shows an explicit PushOrder example. A client may request that a server pushes the next two segments: Segment2 and segment3, as described in the PushType after the one initially requested. For example, the Segment2 may be pushed prior to Segment3.

TABLE 14

| Explicit PushOrder example |
|---|
| Request [Stream ID = 1]:<br>HEADERS<br>  + END_STREAM<br>  + END_HEADERS<br>  :method = GET<br>  :scheme = http<br>  :path = /example/rendition1/segment1<br>  accept-push-policy = "urn:mpeg:dash:fdh:2016:push-next";2;q=1.0; order="explicit"<br>Response [Stream ID = 1]:<br>PUSH_PROMISE<br>  Stream ID = 2<br>  + END_HEADERS<br>  :method = GET<br>  :scheme = http<br>  :path = /example/rendition1/segment2<br>PUSH_PROMISE<br>  Stream ID = 4<br>  + END_HEADERS<br>  :method = GET<br>  :scheme = http<br>  path = /example/rendition1/segment3 |

Table 15 shows a flexible PushOrder example. A client may request that a server pushes the next two segments: Segment2 and segment3, as described in the PushType after the one initially requested. Segment2 may be pushed before or after Segment3, depending on the server's condition.

TABLE 15

| Flexible PushOrder example |
|---|
| Request [Stream ID = 1]:<br>HEADERS<br>  + END_STREAM<br>  + END_HEADERS<br>  :method = GET<br>  :scheme = http<br>  :path = /example/rendition1/segment1 |

TABLE 15-continued

Flexible PushOrder example

```
accept-push-policy = "urn:mpeg:dash:fdh:2016:push-next"; 2;q1.0; order="flexible"
Response [Stream ID = 1]:
PUSH_PROMISE
   Stream ID = 4
   + END_HEADERS
   :method = GET
   :scheme = http
   path = /example/rendition1/segment3
PUSH_PROMISE
   Stream ID = 2
   + END_HEADERS
   :method = GET
   :scheme = http
   :path = /example/rendition1/segment2
```

Figure 27:
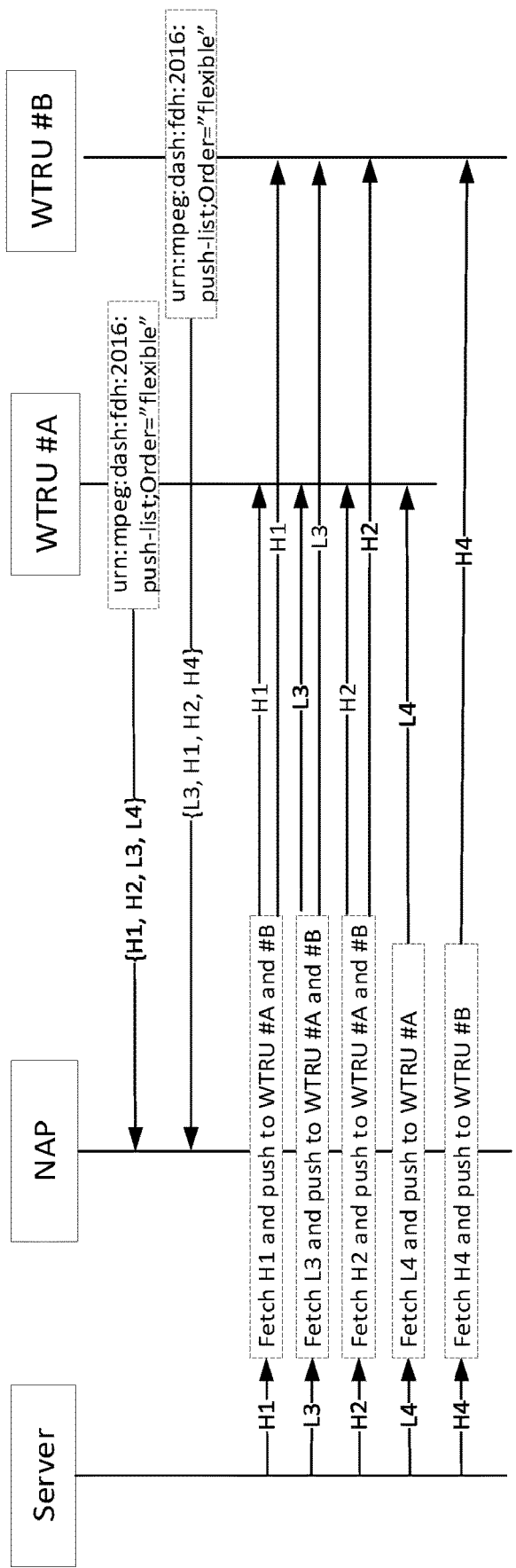
FIG. 27 illustrates an example multicast workflow with flexible push order.

FIG. 27 illustrates an example multicast workflow with flexible push order. As shown in FIG. 27, two or more clients (e.g., WTRU #A and WTRU #B) may send the PushType to the NAP with the push order parameter set to "flexible". NAP may identify one or more multicast segments (e.g., H1, H2, and/or L3) to be shared by two or more WTRUs and one or more unicast segments (e.g., L4 and/or H4) for a WTRU. NAP may fetch multicast segments from the server (e.g., once) and may push to WTRUs, and may fetch unicast segments from the server and may push to the corresponding WTRU individually.

Figure 28:
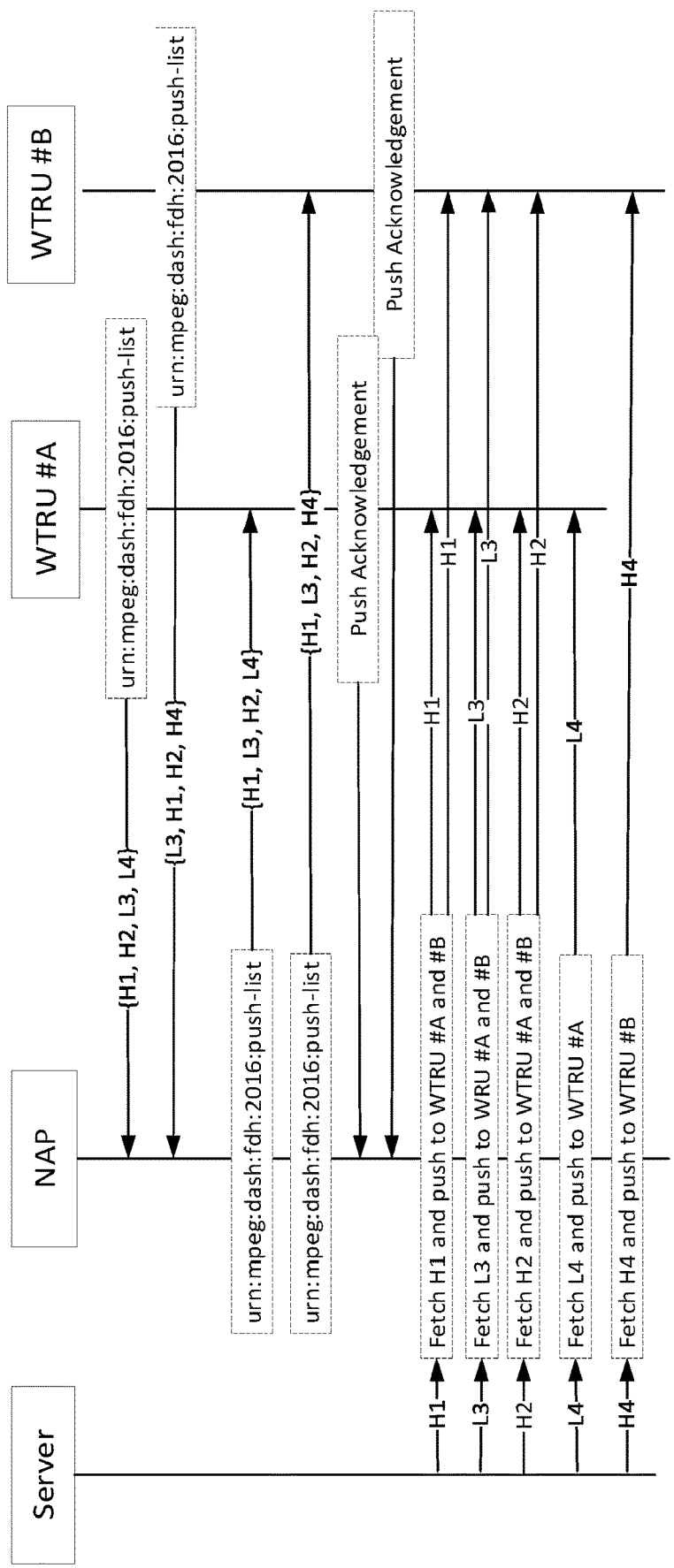
FIG. 28 illustrates an example multicast workflow with NAP initiated push type.

FIG. 28 illustrates an example multicast workflow with NAP initiated push type. Two or more clients (e.g., WTRU #A and WTRU #B) may send PushType to the NAP. NAP may be configured to initiate push directive to a client with a push type (e.g., urn:mpeg:dash:fdh:2016:push-list, urn:mpeg:dash:fdh:2016:push-next and/or urn:mpeg:dash:fdh:2016:push-template) to announce the order of the segments to be pushed to the client. When the NAP receives the acknowledge from the client, the NAP may fetch the segment from the server and may push the segments in the order signaled in the push type. If the push directive is not acknowledged by a client, the NAP may push the segments as originally signaled in the push type received from the client, or the NAP may not acknowledge the push directive from the client.

Figure 29A:
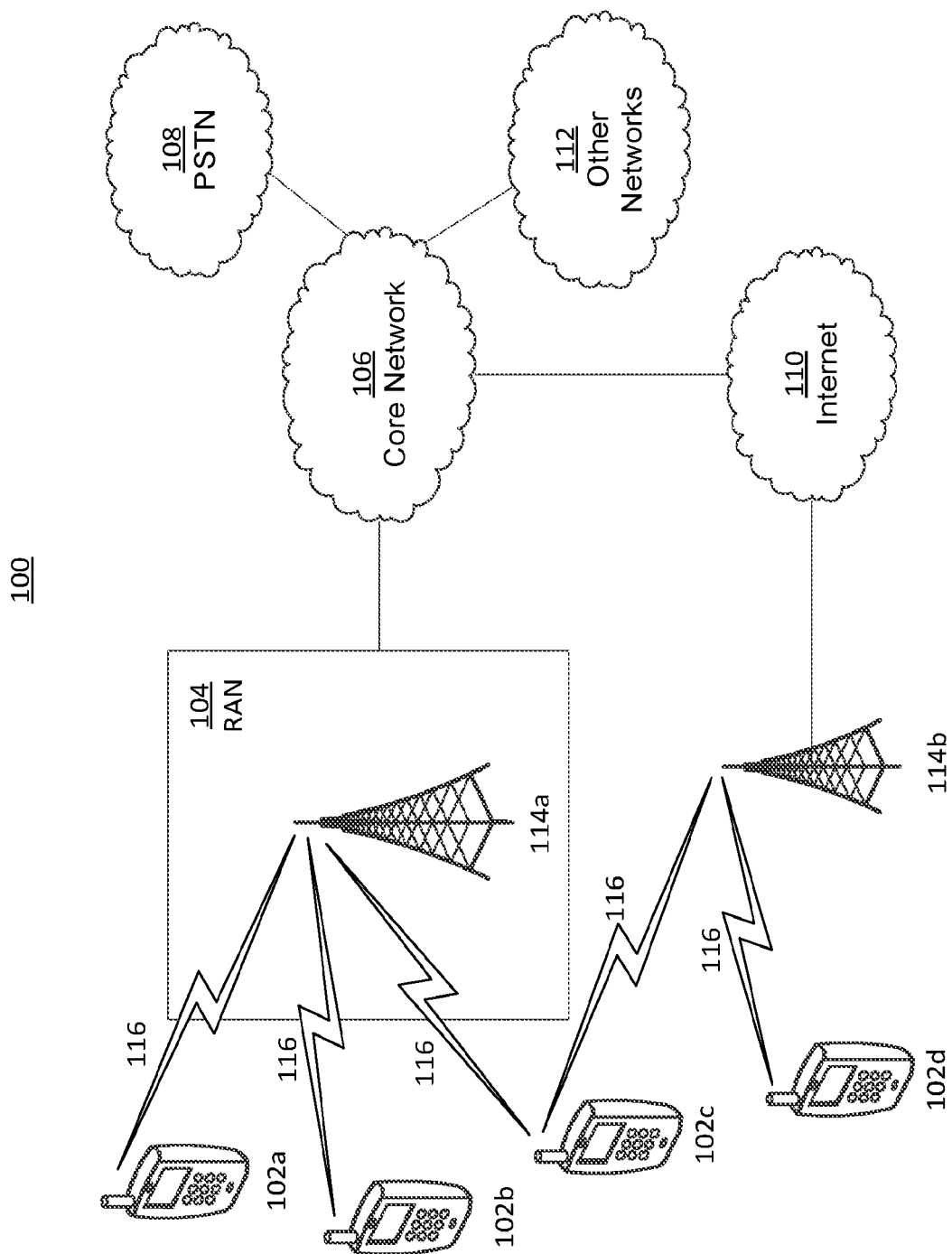
FIG. 29A is a system diagram of an example communications system in which one or more disclosed embodiments may be implemented.

FIG. 29A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 29A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements.

Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., a eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 29A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 29A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 29A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 29A may be configured to communicate with the base station 114*a*, which may employ a cellular-based radio technology, and with the base station 114*b*, which may employ an IEEE 802 radio technology.

Figure 29B:
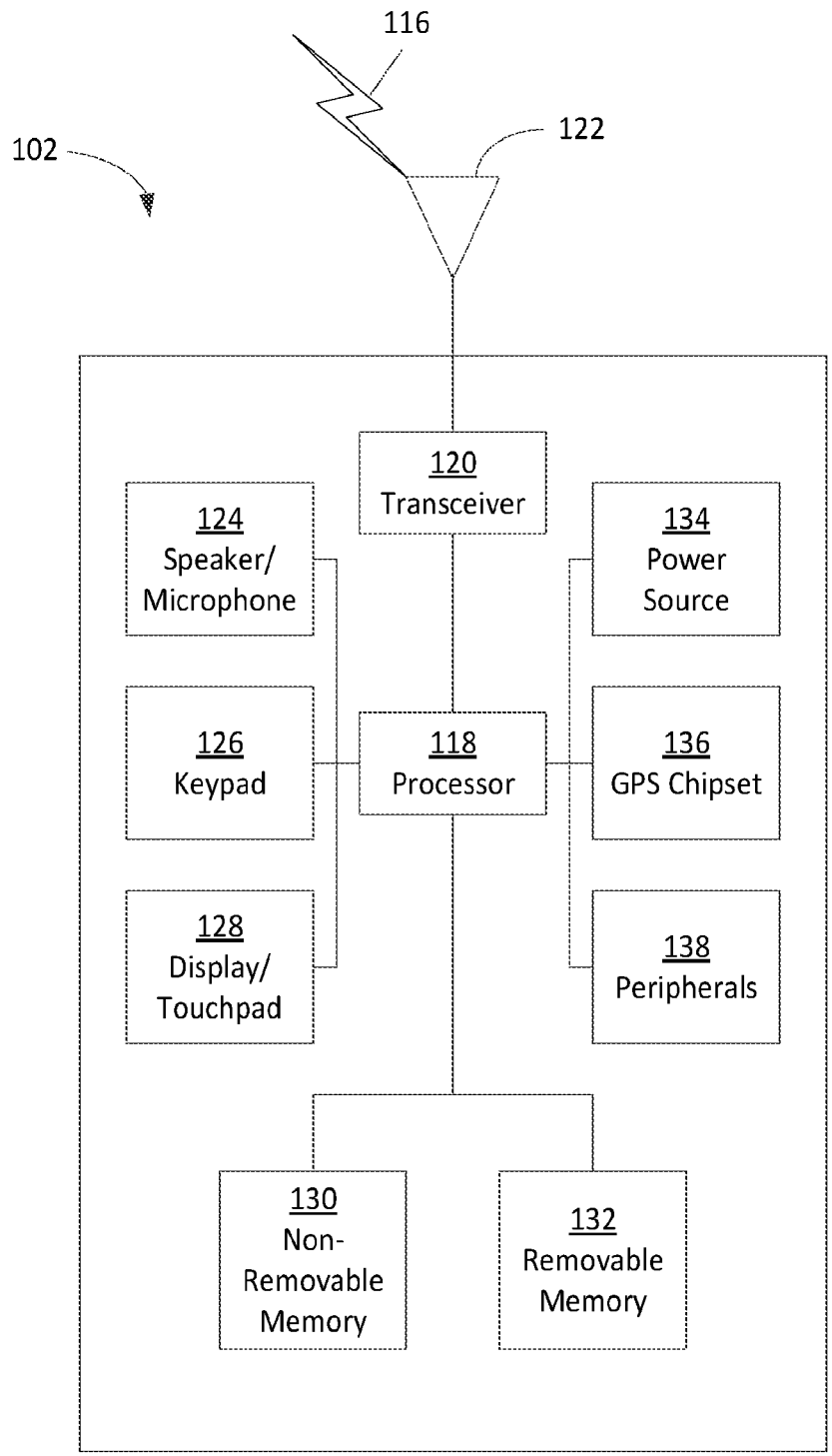
FIG. 29B is a system diagram of an example wireless transmit/receive unit (WTRU) that may be used within the communications system illustrated in FIG. 29A according to an embodiment.

FIG. 29B is a system diagram illustrating an example WTRU 102. As shown in FIG. 29B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 29B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 29B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 29C:
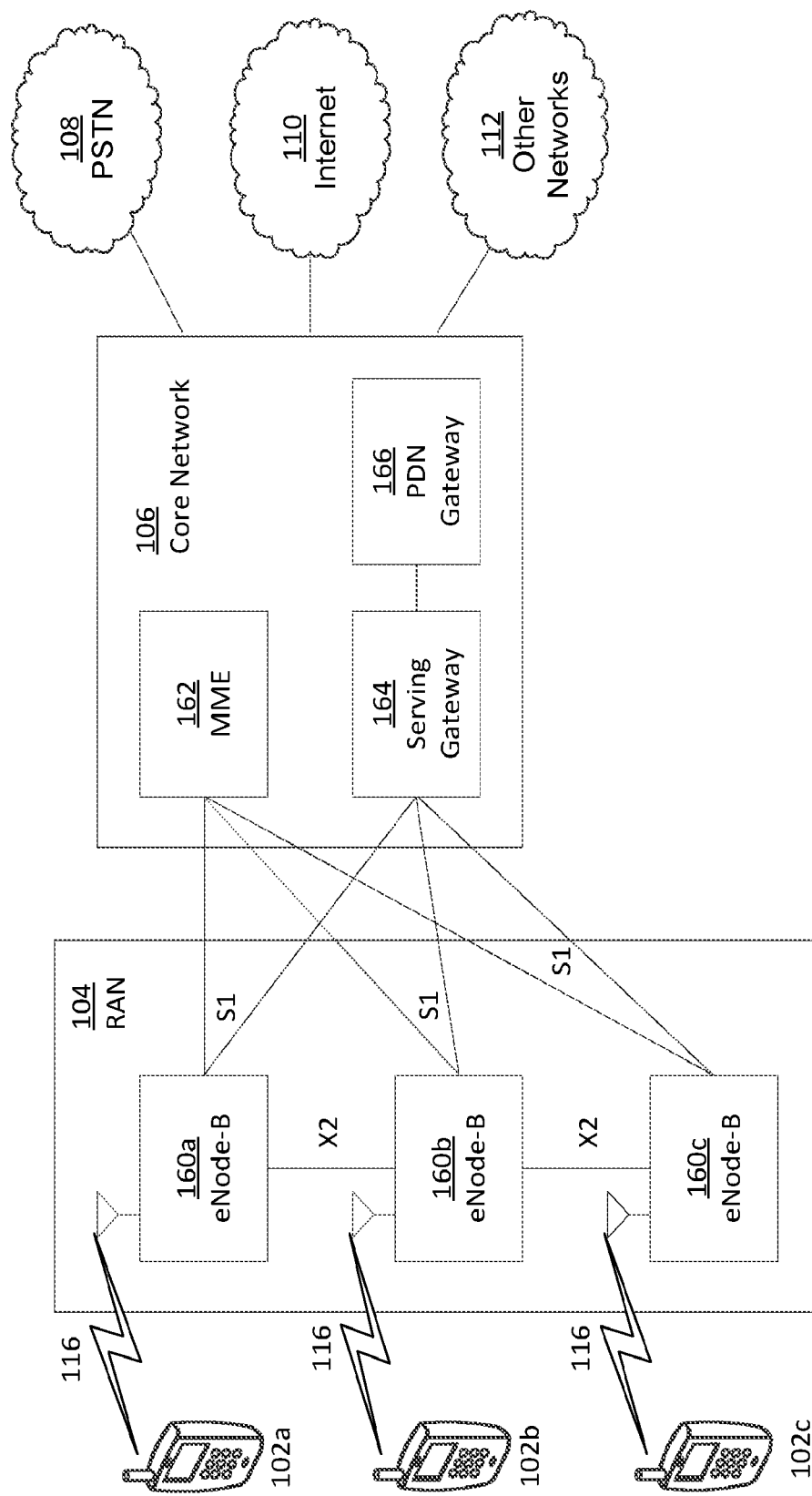
FIG. 29C is a system diagram illustrating an example radio access network (RAN) and an example core network (CN) that may be used within the communications system illustrated in FIG. 29A according to an embodiment.

FIG. 29C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 29C, the eNode-Bs 160a, 160b, 160c may communicate with one another over an X2 interface.

The CN 106 shown in FIG. 29C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 29A-29D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 29D:
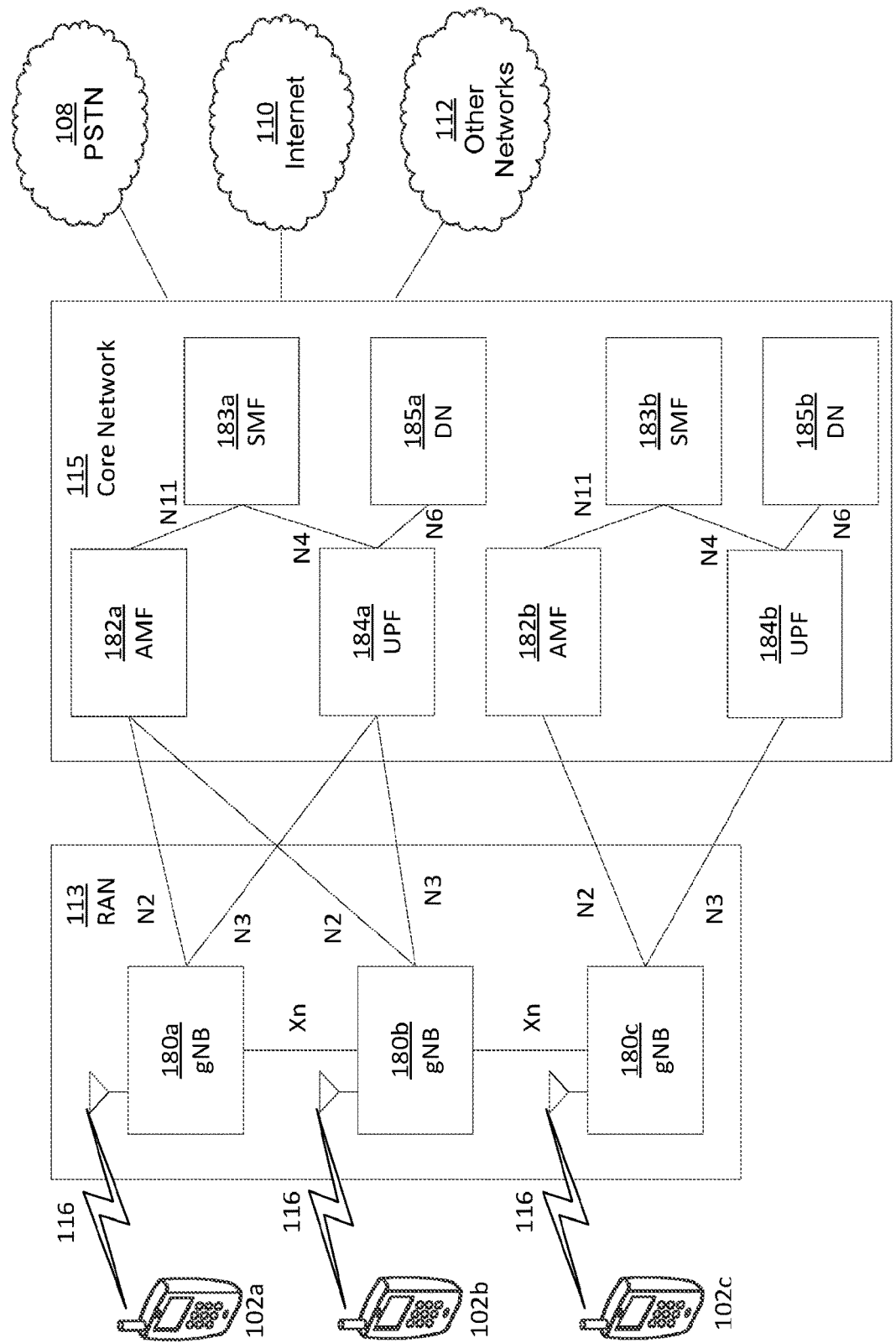
FIG. 29D is a system diagram illustrating a further example RAN and a further example CN that may be used within the communications system illustrated in FIG. 29A according to an embodiment.

FIG. 29D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 29D, the gNBs 180a, 180b, 180c may communicate with one another over an Xn interface.

The CN 115 shown in FIG. 29D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data. Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

What is claimed is:

1. A dynamic adaptive streaming over HTTP (DASH) aware network element (DANE) comprising:
a processor configured to:
receive, from a DASH client, a request associated with a DASH segment and an accepted alternatives message, wherein the accepted alternatives message comprises parameters associated with one or more acceptable alternative DASH segments the DASH client is willing to accept;
generate a delivered alternative message, wherein the delivered alternative message comprises an indication of an alternative DASH segment associated with the one of the one or more acceptable alternative DASH segments; and
send to the DASH client, in response to the accepted alternatives message, the delivered alternative message.

2. The DANE of claim 1, wherein the processor is further configured to receive, from the DASH client, an anticipated requests message that includes an anticipated request for the DASH segment, wherein the anticipated request for the DASH segment is listed in the anticipated requests message based on a decreasing relative priority order, wherein the anticipated request for the DASH segment comprises a source uniform resource locator (URL) of a representation, a range, and a target time, and wherein the anticipated request is arranged with at least one other anticipated request in a decreasing relative priority order.

3. The DANE of claim 1, wherein the parameters associated with the one or more acceptable alternative DASH segments comprise an alternative source uniform resource locator (URL), and an alternative range, wherein the alternative source URL indicates a URL of one of the one or more acceptable alternative DASH segments, and the alternative range indicates a byte range associated with one of the one or more acceptable alternative DASH segments.

4. The DANE of claim 1, wherein the processor is further configured to receive an absolute deadline message comprising an absolute deadline associated with the DASH segment to be available in the DASH client, wherein the absolute deadline is date and time by when the requested DASH segment is to be completely received by the DASH client.

5. The DANE of claim 4, wherein the processor is further configured to sort DASH segments including the DASH segment based on the absolute deadline.

6. The DANE of claim 1, wherein the indication of the alternative DASH segment comprises a URL of the actual delivered content.

7. The DANE of claim 1, wherein the processor is further configured to send the alternative DASH segment to the DASH client.

8. A method implemented by a dynamic adaptive streaming over HTTP (DASH) aware network element (DANE), the method comprising:
receiving, from a DASH client, a request associated with a DASH segment and an accepted alternatives message, wherein the accepted alternatives message comprises parameters associated with one or more acceptable alternative DASH segments the DASH client is willing to accept;
generating a delivered alternative message, wherein the delivered alternative message comprises an indication of an alternative DASH segment associated with the one of the one or more acceptable alternative DASH segments; and
sending to the DASH client, in response to the accepted alternatives message, the delivered alternative message.

9. The method of claim 8, further comprising receiving, from the DASH client, an anticipated requests message that includes an anticipated request for the DASH segment, wherein the anticipated request for the DASH segment is listed in the anticipated requests message based on a decreasing relative priority order, wherein the anticipated request for the DASH segment comprises a source uniform resource locator (URL) of a representation, a range, and a target time, and wherein the anticipated request is arranged with at least one other anticipated request in a decreasing relative priority order.

10. The method of claim 8, wherein the parameters associated with the one or more acceptable alternative DASH segments comprise an alternative source uniform resource locator (URL), and an alternative range, wherein the alternative source URL indicates a URL of one of the one or more acceptable alternative DASH segments, and the alternative range indicates a byte range associated with one of the one or more acceptable alternative DASH segments.

11. The method of claim 8, further comprising receiving an absolute deadline message comprising an absolute deadline associated with the DASH segment to be available in the DASH client, wherein the absolute deadline is date and time by when the requested DASH segment is to be completely received by the DASH client.

12. The method of claim 11, further comprising sorting DASH segments including the DASH segment based on the absolute deadline.

13. The method of claim 8, wherein the indication of the alternative DASH segment comprises a URL of the actual delivered content.

14. The method of claim 8, further comprising sending the alternative DASH segment to the DASH client.

15. A dynamic adaptive streaming over HTTP (DASH) client comprising:
a processor configured to at least:
generate an accepted alternatives message, wherein the accepted alternatives message comprises parameters associated with one or more acceptable alternative DASH segments the DASH client is willing to accept;
send, to a DASH aware network element (DANE), a request associated with a DASH segment and the accepted alternatives message indicating the one or more acceptable alternative DASH segments; and
receive from the DANE, in response to the accepted alternatives message, a delivered alternative message, wherein the delivered alternative message comprises an indication of an alternative DASH segment associated with the one of the one or more acceptable alternative DASH segments.

16. The DASH client of claim 15, wherein the processor is further configured to send, to the DANE, an anticipated requests message that includes an anticipated request for the DASH segment, wherein the anticipated request for the DASH segment is listed in the anticipated requests message based on a decreasing relative priority order.

17. The DASH client of claim 16, wherein the anticipated request for the DASH segment comprises a source uniform resource locator (URL) of a representation, a range, and a target time, and wherein the anticipated request is arranged with at least one other anticipated request in a decreasing relative priority order.

18. The DASH client of claim 15, wherein the parameters associated with the one or more acceptable alternative DASH segments comprise an alternative source uniform resource locator (URL), and an alternative range.

19. The DASH client of claim 18, wherein the alternative source URL indicates a URL of one of the one or more acceptable alternative DASH segments, and the alternative range indicates a byte range associated with one of the one or more acceptable alternative DASH segments.

20. The DASH client of claim 15, wherein the processor is further configured to send an absolute deadline message comprising an absolute deadline associated with the DASH segment to be available in the DASH client, and wherein the absolute deadline is date and time by when the requested DASH segment is to be completely received by the DASH client.

* * * * *